(12) United States Patent
Goh

(10) Patent No.: US 11,250,513 B2
(45) Date of Patent: Feb. 15, 2022

(54) COMPUTER IMPLEMENTED SYSTEM FOR GENERATING ASSURANCE RELATED PLANNING PROCESS AND DOCUMENTS FOR AN ENTITY AND METHOD THEREOF

(71) Applicant: AMC Future Technology Pte. Ltd., Singapore (SG)

(72) Inventor: Tang Kwee Goh, Singapore (MY)

(73) Assignee: AMC Future Technology Pte. Ltd., Singapore (SG)

( * ) Notice: Subject to any disclaimer, the term of this patent is extended or adjusted under 35 U.S.C. 154(b) by 0 days.

(21) Appl. No.: 16/798,976

(22) Filed: Feb. 24, 2020

(65) Prior Publication Data
US 2021/0201412 A1    Jul. 1, 2021

(30) Foreign Application Priority Data
Dec. 31, 2019    (SG) .............................. 10201914012P

(51) Int. Cl.
*G06Q 40/00* (2012.01)
*G06Q 40/06* (2012.01)
(Continued)

(52) U.S. Cl.
CPC ............... *G06Q 40/06* (2013.01); *G06N 3/08* (2013.01); *G06Q 10/10* (2013.01);
(Continued)

(58) Field of Classification Search
USPC ...... 705/36, 37, 38, 39, 40, 45, 26; 700/236, 700/245; 709/217, 218, 226, 227; 706/25, 45; 715/708, 704, 753; 235/375, 235/380; 340/540; 719/328, 315; 717/108; 726/9, 6; 463/25, 20
See application file for complete search history.

(56) References Cited

U.S. PATENT DOCUMENTS 6,023,578 A * 2/2000 Birsan ....................... G06F 8/10
717/105
7,003,482 B1 * 2/2006 Margoscin ............. G06Q 10/10
705/35
(Continued)

OTHER PUBLICATIONS

Evaluating the Quality of Social Media Data in Big Data Architecture; IEEE Access (vol. 3, pp. 2028-2043); Anne Immonen; Pekka Paakkonen; Eila Ovaska; Jan. 1, 2015. (Year: 2015).*
(Continued)

*Primary Examiner* — Tien C Nguyen
(74) *Attorney, Agent, or Firm* — The Webb Law Firm

(57) ABSTRACT

Disclosed is a computer implemented system for generating assurance related planning process and documents for an entity, the system comprises a computer arrangement having a computing device communicably coupled to plurality of input-and/or output devices to acquire inputs and source data of the entity from a user and a server arrangement communicably coupled to the computer arrangement, wherein the server arrangement comprises at least one processing unit, and at least one memory unit configured to store plurality of processing instruction. Another aspect of the present disclosure discloses a method for generating an audit report assurance related planning process and documents for an entity.

27 Claims, 19 Drawing Sheets

(51) Int. Cl.
  *G06Q 10/10* (2012.01)
  *G06N 3/08* (2006.01)
  *G06Q 30/02* (2012.01)
  *G06Q 40/02* (2012.01)

(52) U.S. Cl.
  CPC ......... *G06Q 30/0203* (2013.01); *G06Q 40/02* (2013.01); *G06Q 40/12* (2013.12)

(56) References Cited

U.S. PATENT DOCUMENTS

| | | | | |
|---|---|---|---|---|
| 7,668,860 B2* | 2/2010 | Naibo | ............... | G06F 16/86 707/794 |
| 7,676,427 B1* | 3/2010 | Bongiorno | ............ | G06Q 10/10 705/38 |
| 7,856,617 B2* | 12/2010 | Szlam | ............... | G06Q 40/08 717/106 |
| 7,899,693 B2* | 3/2011 | King | ............... | G06Q 10/063 705/7.11 |
| 7,991,658 B2* | 8/2011 | Bond | ............... | G06Q 40/12 705/30 |
| 8,050,988 B2* | 11/2011 | Kershner | ......... | G06Q 10/0635 705/31 |
| 8,065,168 B2* | 11/2011 | Szlam | ............... | G06Q 10/06 705/4 |
| 8,234,136 B2* | 7/2012 | McDougall | ......... | G06Q 10/063 705/7.11 |
| 8,320,656 B1* | 11/2012 | Bhatt | ............... | G06Q 40/02 382/138 |
| 8,453,138 B2* | 5/2013 | Meller | ............... | G06F 8/658 717/170 |
| 8,478,769 B2* | 7/2013 | Goldfarb | ............ | G06Q 10/10 707/758 |
| 8,904,349 B2* | 12/2014 | Hudson, Jr. | ............ | G06F 8/38 717/116 |
| 2003/0158760 A1* | 8/2003 | Kannenberg | ......... | G06Q 40/02 705/4 |
| 2004/0103124 A1* | 5/2004 | Kupkova | ............ | G06F 16/93 |
| 2008/0228800 A1* | 9/2008 | Dertinger | ............ | G06F 16/2423 |
| 2008/0235064 A1* | 9/2008 | Gulko | ............... | G06Q 40/00 705/4 |
| 2009/0100004 A1* | 4/2009 | Andrei | ............... | G06F 16/24542 |
| 2009/0132456 A1* | 5/2009 | Dertinger | ............ | G06N 5/025 706/47 |
| 2009/0138456 A1* | 5/2009 | Dettinger | ............ | G06F 16/2428 |
| 2011/0072416 A1* | 3/2011 | Hudson, Jr. | ............ | G06F 8/38 717/122 |
| 2011/0270870 A1* | 11/2011 | Dertinger | ............ | G06F 16/951 707/769 |
| 2016/0125751 A1* | 5/2016 | Barker | ............... | G06F 16/3332 434/322 |

OTHER PUBLICATIONS

Data quality: a rising e-business concern; IT Professional (vol. 2, Issue: 4, pp. 10-14); L.D. Paulson; Jul. 1, 2000. (Year: 2000).*

A framework for analysis of data quality research; IEEE Transactions on Knowledge and Data Engineering (vol. 7, Issue: 4, pp. 623-640); R.Y. Wang; V.C. Storey; C.P. Firth; Aug. 1, 1995. (Year: 1995).*

\* cited by examiner

COMPUTER IMPLEMENTED SYSTEM FOR GENERATING ASSURANCE RELATED PLANNING PROCESS AND DOCUMENTS FOR AN ENTITY AND METHOD THEREOF

CROSS-REFERENCE TO RELATED APPLICATION

This application claims priority to Singaporean Patent Application No. 10201914012P filed Dec. 31, 2019, the disclosure of which is hereby incorporated by reference in its entirety.

BACKGROUND

Technical Field

The present disclosure relates generally to artificial intelligence, with a knowledge-based system for carrying out financial audit of an entity and more specifically, to computer implemented system for generating assurance related planning process and documents for an entity. Furthermore, the present disclosure relates to a method for generating an audit report assurance related planning process and documents for an entity.

Technical Considerations

Financial audit is for audit profession to provide "reasonable" assurance over the accuracy, truth and fairness of the financial statement so that stakeholders and users can place trust and reliance on such financial statements for decision making. The financial audit optionally includes quantitative and qualitative auditing, which often involves professional judgement such as identifying risks, interpretation of audit evidences, selection of audit procedures, and familiarity of specific business or industry benchmarking.

In general, auditors often receive various financial documents that may have critical impact to risk assessment. The financial documents provided to the auditors are usually presented in a PDF or spread sheet format, and may need further processing as well as transposing to facilitate the audit process. As paper documents (known as hardcopies) are converted to digital image files and use of automated workflow has proven some productivity gain. However, deep understanding of the financial documents (e.g. trending comparison) of an audit process and methodology remains a tedious and laborious job, depending much on knowledge and experience of relevant personnel (e.g. auditors).

Such a conventional approach may impose various challenges for carrying out financial audit of an entity accurately. Examples of such challenges may include, but is not limited to, manual and time taking process, chances of calculation or data entry errors, failure to consider the global market changes and based upon the skills of the auditors and experts, an audit strategy is developed which may or may not be accurate. Another challenge is that it can be costly to staff qualified auditors or experts to perform the audit management throughout an entire auditing process.

Therefore, in light of the foregoing discussion, there exists a need to overcome the aforementioned drawbacks associated with the conventional audit system for an entity.

SUMMARY

The present disclosure seeks to provide a computer implemented system for generating assurance related planning process and documents for an entity. The present disclosure also seeks to provide a method for generating an audit report assurance related planning process and documents for an entity.

The present disclosure seeks to provide a solution to the existing problems associated with the conventional audit system. An aim of the present disclosure is to provide a solution that at least partially overcomes the problems encountered in the prior art, and provides an automated computer implemented system and method that is less expensive and it has the advantage of increased efficiency and time management due to its ability to perform rapid analysis of complex financial accounting data. It also provides higher accuracy results and helps in eliminating any kind of manual errors.

In a first aspect, a non-limiting embodiment of the present disclosure provides a system comprising:
  a computer arrangement comprises a computing device communicably coupled to plurality of input-and/or output devices to acquire inputs and source data of the entity from a user; and
  a server arrangement communicably coupled to the computer arrangement, wherein the server arrangement comprises at least one processing unit, and at least one memory unit configured to store plurality of processing instruction that, when executed by the at least one processing unit, causes the at least one processing unit to:
  analyze the source data to identify data with financial characteristics in form of quantitative and/or qualitative content to generate a machine-coded output for the entity including the identified data with financial characteristics;
  acquire response from the user for sequentially provided plurality of questionnaire sets, wherein each questionnaire set comprises plurality of queries associated with operation of the entity, and wherein the plurality of queries in a given questionnaire set is generated based on responses provided by the user to the plurality of queries included in a questionnaire set that precedes the given questionnaire set;
  analyze the acquired response from the user using artificial neural network to validate and train from the acquired response;
  analyze the machine-coded output using the trained artificial neural network and external financial data, wherein the external financial data is obtained or received from a third-party;
  generate a first user interface to display a first machine-coded questionnaires for the entity, wherein the questionnaires comprising plurality of risk assessment parameters (also known as risk assessment auditing parameters);
  acquire at least one input from the user for at least one risk assessment parameter of the plurality of risk assessment parameters to further validate and train the trained artificial neural network; and
  generate a second user interface to display a second machine-coded questionnaires for the entity incorporating the at least one input associated with the at least one risk assessment parameter.

In a second aspect, a non-limiting embodiment of the present disclosure provides a method implemented via a system comprising:
  analyzing source data provided by a user to identify financial data with financial nature/characteristics statements to generate a machine-coded financial document output for the entity including the identified financial data with financial nature/characteristics statements;

acquiring response from the user for sequentially provided plurality of questionnaire sets, wherein each questionnaire set comprises plurality of queries associated with operation of the entity, and wherein the plurality of queries in a given questionnaire set is generated based on responses provided by the user to the plurality of queries included in a questionnaire set that precedes the given questionnaire set;

analyzing the acquired response from the user using artificial neural network to validate and train from the acquired response;

analyzing the machine-coded output financial document using the trained artificial neural network and global financial trend external financial data, wherein the global financial trend external financial data is obtained or received from a third-party;

generating a first user interface to display a first machine-coded questionnaires audit report for the entity, wherein the questionnaires audit report comprising plurality of risk assessment auditing parameters;

acquiring at least one input from the user for at least one risk assessment auditing parameter of the plurality of risk assessment auditing parameters to further validate and train the trained artificial neural network; and generating a second user interface to display a second machine-coded questionnaires audit report for the entity incorporating the at least one input associated with the at least one risk assessment auditing parameter.

Optionally, the method further uses supervised learning, unsupervised learning to identify data with financial characteristics for generating a machine-coded output for the entity. More optionally, the method using supervised learning comprises determining the type of training set, gathering a training set, determining the input feature representation of the learned function; and determining structure of the learned function and corresponding learning algorithm.

Non-limiting embodiments of the present disclosure substantially eliminate or at least partially address the aforementioned problems in the prior art, and enables to determine a region of interest of a user in a virtual environment.

Additional aspects, advantages, features and objects of the present disclosure would be made apparent from the drawings and the detailed description of the illustrative non-limiting embodiments construed in conjunction with the appended claims that follow.

It will be appreciated that features of the present disclosure are susceptible to being combined in various combinations without departing from the scope of the present disclosure as defined by the appended claims.

The summary above, as well as the following detailed description of illustrative non-limiting embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

BRIEF DESCRIPTION OF THE DRAWINGS

Non-limiting embodiments of the present disclosure will now be described, by way of example only, with reference to the following diagrams wherein.

Figure 1:
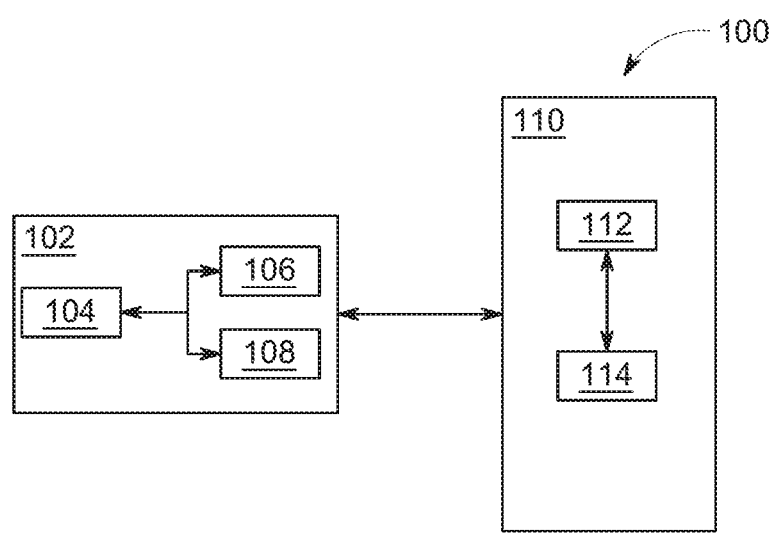
FIG. 1 (i.e. figure or Fig.) is a block diagram of a system for generating assurance related planning process and documents for an entity, in accordance with a non-limiting embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF THE INVENTION

For purposes of promoting and understanding the principles of the disclosure, reference will now be made to the non-limiting embodiments illustrated in the drawings and specific language will be used to describe the same. It will nevertheless be understood that no limitation of the scope of the disclosure is thereby intended. The disclosure includes any alterations and further modifications in the illustrated devices and described methods and further applications of the principles of the disclosure that would normally occur to one skilled in the art to which the disclosure relates. Furthermore, in the following detailed description, numeric values and ranges are provided for various aspects of the implementations described. These values and ranges are to be treated as an example only, and are not intended to limit the scope of the claims. In addition, a number of materials are identified as suitable for various facets of the implementations. These materials are to be treated as exemplary, and are not intended to limit the scope of the disclosure.

In a first aspect, a non-limiting embodiment of the present disclosure provides a system comprising:

a computer arrangement comprises a computing device communicably coupled to plurality of input-and/or output devices to acquire inputs and source data of the entity from a user; and a server arrangement communicably coupled to the computer arrangement, wherein the server arrangement comprises at least one processing unit, and at least one memory unit configured to store plurality of processing instruction that, when executed by the at least one processing unit, causes the at least one processing unit to:

analyze the source data to identify data with financial characteristics in form of quantitative and/or qualitative content to generate a machine-coded output for the entity including the identified data with financial characteristics;

acquire response from the user for sequentially provided plurality of questionnaire sets, wherein each questionnaire set comprises plurality of queries associated with operation of the entity, and wherein the plurality of queries in a given questionnaire set is generated based on responses provided by the user to the plurality of queries included in a questionnaire set that precedes the given questionnaire set;

analyze the acquired response from the user using artificial neural network to validate and train from the acquired response;

analyze the machine-coded output using the trained artificial neural network and external financial data, wherein the external financial data is obtained or received from a third-party;

generate a first user interface to display a first machine-coded questionnaires for the entity, wherein the questionnaires comprising plurality of risk assessment parameters;

acquire at least one input from the user for at least one risk assessment parameter of the plurality of risk assessment parameters to further validate and train the trained artificial neural network; and generate a second user interface to display a second machine-coded questionnaires for the entity incorporating the at least one input associated with the at least one risk assessment parameter.

In a second aspect, a non-limiting embodiment of the present disclosure provides a method implemented via a system comprising:

analyzing source data provided by a user to identify financial data with financial nature/characteristics statements to generate a machine-coded financial document output for the entity including the identified financial data with financial nature/characteristics statements;

acquiring response from the user for sequentially provided plurality of questionnaire sets, wherein each questionnaire set comprises plurality of queries associated with operation of the entity, and wherein the plurality of queries in a given questionnaire set is generated based on responses provided by the user to the plurality of queries included in a questionnaire set that precedes the given questionnaire set;

analyzing the acquired response from the user using artificial neural network to validate and train from the acquired response;

analyzing the machine-coded output financial document using the trained artificial neural network and global financial trend external financial data, wherein the global financial trend external financial data is obtained or received from a third-party;

generating a first user interface to display a first machine-coded questionnaires audit report for the entity, wherein the questionnaires audit report comprising plurality of risk assessment auditing parameters;

acquiring at least one input from the user for at least one risk assessment auditing parameter of the plurality of risk assessment auditing parameters to further validate and train the trained artificial neural network; and generating a second user interface to display a second machine-coded questionnaires audit report for the entity incorporating the at least one input associated with the at least one risk assessment auditing parameter.

The following detailed description illustrates non-limiting embodiments of the present disclosure and ways in which they can be implemented. Although some modes of carrying out the present disclosure have been disclosed, those skilled in the art would recognize that other non-limiting embodiments for carrying out or practicing the present disclosure are also possible.

Referring to FIG. 1, there is shown a block diagram of a system 100 for generating assurance related planning process and documents for an entity, in accordance with a non-limiting embodiment of the present disclosure. As shown the system 100 include a computer arrangement 102 comprises a computing device 104 communicatively connected to plurality of input-and/or output devices 106 and 108, and a server arrangement 108.

The system 100 is configured for generating assurance related planning process and documents for an entity. The system 100 refers to an arrangement of one or more physical and logical units that are configured to operate in a manner that the arrangement generates assurance related planning process and documents for an entity. Throughout the present disclosure, the term "business entity" refers to any nonprofit, for profit, or governmental company, organization, group, agency or other entity involved in doing business. For example, a business entity may be a registered company that may involve in various business activities such as event, practice, procedure or matter. Further, the assurance related planning process and documents generally encompasses analyzing plurality of financial and operational condition of the entity and create an efficient audit planning process and related documents to enable the efficient audit planning process. As used herein, the term "audit" refers to an evaluation of one or more financial device or asset to determine its compliance with a policy. Optionally, that assurance related planning process is a planning process that are guided by plurality of auditing factors that ensures an errorless audit process planning and execution. It will be appreciated that the documents refer to any and all textual or graphical information that enables an auditor to conduct an audit of the entity. In other words, the document includes a data file that may be returned as a output by the system 100 as the result of processing of one or more financial device or asset to determine its compliance with a policy of an entity. In an example, the documents may be anyone of business reports, spreadsheets materials, image media, word processing files, visual slide presentations, and the like.

The computer arrangement 102 comprises the computing device 104. Throughout the present disclosure, the computer arrangement 102 refers to collection of one or more computing resources that are capable of acquiring and processing of data of the entity, and providing output for the processed data. Furthermore, the computing device 104 included in the computer arrangement 102 relates to an electronic device associated with (or used by) a user that is capable of enabling the user to perform specific tasks associated with the aforementioned system/method. Furthermore, the computing device 104 is intended to be broadly interpreted to include any electronic device that may be used for voice and/or data communication over a wireless communication network. Examples of computing device 104 include, but are not limited to, cellular phones, personal digital assistants (PDAs), handheld devices, wireless modems, laptop computers, personal computers, etc. Moreover, computing device 104 may alternatively be referred to as a mobile station, a mobile terminal, a subscriber station, a remote station, a user terminal, a terminal, a subscriber unit, an access terminal, etc. Additionally, the computing device 104 includes a casing, a memory, a processor, a network interface card, a microphone, a speaker, a keypad, and a display. Moreover, the computing device 104 is to be construed broadly, so as to encompass a variety of different types of mobile stations, subscriber stations or, more generally, communication devices, including examples such as a combination of a data card inserted in a laptop. Such communication devices are also intended to encompass devices commonly referred to as "access terminals".

The computing device 104 is communicably coupled to plurality of input-and/or output devices 106 and 108, to acquire inputs and source data of the entity from a user. The input devices 106 refers to electronic devices that are configured to enable user to input information, digitalize the input information and provide the digitalized input information to the computing device (such as the computing device 104), furthermore output devices 108 refers to electronic devices that are configured to provide the user with an output generated by the computing device 104. Examples of input- and/or output devices 106 and 108 include a monitor, speakers, a printer, a keyboard, a pointing device, a scanner, personal digital assistants, a microphone and other peripheral devices. USB is merely one exemplary type of interface that may be used to connect peripheral devices. Optionally, other interfaces may alternatively be used. It will be appreciated by that the term 'user' as used herein relates to any entity including a person (i.e., human being), or a virtual personal assistant (an autonomous program or a bot) using a device and/or system described herein.

Furthermore, the user may use the plurality of input-and/ or output devices 106 and 108 to provide inputs and source data related to the entity. The inputs and source data related to the entity refers to the accounting financial data of the entity. In an example, the inputs may be provided by the user using a keyboard. In such instance, the input can be related to an expenditure related to the entity. In another instance, the input can be related to an income related to the entity. In yet another instance, the input can be related to an ROI related to the entity. In another example, the source data may be provided by the user using a scanner or a data card attached to the computing device (such as the computing device 104). In such instance, the source data can be related an image of the memo to an expenditure related to the entity. In another instance, the input can be related to a screenshot of an income receipt related to the entity. In yet another instance, the input can be related to a machine-coded document (such as Microsoft Word® document or Microsoft Excel® spreadsheet provided from a data card) related to ROI related to the entity.

The server arrangement 108 communicably coupled to the computer arrangement 102. Throughout the present disclosure, the term 'server arrangement' relates to a structure and/or module that include programmable and/or non-programmable components configured to store, process and/or share information. Additionally, the server arrangement 108 include one or more data processing facilities for the storing, processing and/or share data and/or set of instruction. Furthermore, the server arrangement 108 includes hardware, software, firmware or a combination of these, suitable for storing and processing various information and services accessed by the one or more user using the one or more computing device (such as the computer arrangement 102). Optionally, the server arrangement 108 includes any arrangement of physical or virtual computational entities capable of enhancing information to perform various computational tasks. Furthermore, it should be appreciated that the server arrangement 108 may be both single hardware server and/or plurality of hardware servers operating in a parallel or distributed architecture. In an example, the server arrangement 108 may include components such as memory, a processor, a network adapter and the like, to store, process and/or share information with other components, such as computer arrangement 102, computing device 104, or plurality of input-and/or output devices 106 and 108. Optionally, the server is implemented as a computer program that provides various services to other devices, modules or apparatus. Optionally, the server arrangement 108 is implemented as cloud architecture.

The server arrangement 108 may include, for example, a component that enables electronic communications via a network to communicably coupled to the computer arrangement 102. Furthermore, the network may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Moreover, any other suitable protocols using voice, video, data, or combinations thereof, can also be employed by the network.

The server arrangement 108 comprises at least one processing unit 110, and at least one memory unit 112 configured to store plurality of processing instruction. Throughout the present disclosure, the term 'at least one processing unit' relates to a computational element that is operable to respond to and processes instructions that drive the system (such as the system 100). Optionally, the processing unit 110 includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processing unit 110 may refer to one or more individual processors, processing devices and various elements associated with a processing device that may be shared by other processing devices. Additionally, the one or more individual processors, processing devices and elements are arranged in various architectures for responding to and processing the instructions that drive the system 100.

Furthermore, the at least one memory unit 112 as used herein relates to a volatile or persistent medium, such as an electrical circuit, magnetic disk, virtual memory or optical disk, in which a computer can store data or software for any duration. Optionally, the at least one memory unit 112 is non-volatile mass storage such as physical storage media. Furthermore, the at least one memory unit 112 can be distributed in a scenario wherein server arrangement 108 is distributed.

The plurality of processing instruction stored in the at least one memory unit 112 relates to any collection or set of instructions executable by a digital system (such as the processing unit 110) so as to perform a various task that is the intent of the system 100. Additionally, the plurality of processing instruction is intended to encompass such instructions, modules or routine stored in storage medium such as RAM, a hard disk, optical disk, or so forth, and is also intended to encompass so-called "firmware" that is software stored on a ROM or so forth. Optionally, the plurality of processing instruction refers to software application. Such plurality of processing instruction is organized in various ways, for example the plurality of processing instruction includes software components organized as libraries, Internet-based programs stored on a remote server or so forth, source code, interpretive code, object code, directly executable code, and so forth. It may be appreciated that the software may invoke system-level code or calls to other software residing on a server or other location to perform certain functions. Furthermore, the plurality of processing instruction is executed by the at least one processing unit. Optionally, the plurality of processing instruction comprises deep learning algorithms (explained herein later).

The processing unit 110 executes the processing instruction to cause the processing unit 110 to analyze the source data to identify data with financial characteristics in form of quantitative and/or qualitative content to generate a machine-coded output for the entity including the identified data with financial characteristics. The execution of the processing instruction at the processing unit 110 configures the processing unit 110 to analyze the source data for identifying data with financial characteristics in form of quantitative and/or qualitative content. The processing instruction may include a module for identifying relevant topical information in the source data.

Optionally, system uses supervised learning, unsupervised learning and/or automated machine learning module to identify data with financial characteristics for generating a machine-coded output for the entity. The system is sometimes configured to solve classification by using logistic regression algorithm and/or clustering problems by using K-means algorithm etc. The supervised learning optionally adopts following algorithms, including Support Vector Machines, linear regression, logistic regression, naive Bayes, linear discriminant analysis, decision trees, k-nearest neighbor, Neural Networks (Multilayer perceptron), similarity learning, etc.

A method of supervised learning possibly includes a first step of determining the type of training set, including examples. Before doing anything else, a user decides what kind of data is to be used as a training set. The method may include a second step of gather a training set. The training set needs to be representative of the real-world use of the function. Thus, a set of input objects is gathered and corresponding outputs are also gathered, either from human experts or from measurements (field collection during auditing). The method sometimes includes a third step of determining the input feature representation of the learned function. The accuracy of the learned function depends strongly on how the input object is represented. Typically, the input object is transformed into a feature vector, which contains a number of features that are descriptive of the object. The number of features should not be too large, because of the curse of dimensionality; but should contain enough information to accurately predict the output. The method optionally includes a fourth step of determining structure of the learned function and corresponding learning algorithm. For example, an experienced auditor may choose to use support vector machines or decision trees. The method often involves another step of completing the design. Run the learning algorithm on the gathered training set. Some supervised learning algorithms require the user (auditing personnel) to determine certain control parameters. These parameters may be adjusted by optimizing performance on a subset (called a validation set) of the training set, or via cross-validation. The method usually includes another step of evaluating the accuracy of the learned function. After parameter adjustment and learning, the performance of the resulting function should be measured on a test set that is separate from the training set.

Optionally, the automated machine learning module includes Natural Language Processing routine. In this context, the Natural Language Processing routine is related to the area of human-computer interaction and natural language understanding by computer systems that enable computer systems to derive meaning from human or natural language input. In an example, Natural Language Processing routine may be used to identify specified terms, such as named entities, phrases, or urgent terms contained in a text statement such as "Cost Profit from continuing operations X %" and subsequently derive meaning therefrom. In such instance, the Natural Language Processing routine may be configured to identify specified terms, such as entities, phrases, or numerical terms contained in the statement having financial characteristics. Optionally, the Natural Language Processing routine may be adapted to apply word-stemming, singularize words, syllable and character-sequence analysis such as part numbers, abbreviations, internal identifications, etc. to determine financial characteristics therein. It will be appreciated that the financial characteristics refers to inclusion of textual data related to the financial state or history of the entity. The Natural Language Processing routine identifies key terms and attributes in the statement and compares the identified terms to the stored terms in a domain dictionary to derive meaning of the statement. Optionally, the Natural Language Processing routine of customs transaction records may include similarity-matching natural language processing algorithms that perform calculations based on the frequency of terms (understood to include character sequences, syllables, words, and other linguistic formulations) used in large numbers of documents. In an example, processing the plurality of transactions records (related to financial state or history of the entity) comprises processing more than 100,000 records in less than 3 minutes on 10 cores. Optionally, the deep learning algorithms are implemented as a framework for natural language processing of text. The source data to identify data with financial characteristics is analyzed in form of quantitative and/or qualitative content to generate a machine-coded output for the entity including the identified data. The Natural Language Processing routine included in the processing instruction is configured to analyze the source data in form of quantitative and/or qualitative content. Optionally, the automated machine learning module includes an analyzer that identifies quantitative and/or qualitative content in the source data and passes the identified quantitative and/or qualitative content to the Natural Language Processing routine for further processing. Thereafter the Natural Language Processing routine generates the machine-coded output for the entity including the identified data. For example, the Natural Language Processing routine processes the various source data of a year that is related to the entity and generates a yearly financial statement.

Optionally the source data are analyzed using one or more analytical artificial intelligence algorithms. The one or more analytical artificial intelligence algorithms comprise one or more supervised learning algorithms. Experienced and/or senior personnel are able to annotate or label input and/output data of the system so that the system is able to be trained under supervision. Examples of the supervised learning algorithms include Support Vector Machines, linear regression, logistic regression, naive Bayes, linear discriminant analysis, decision trees, k-nearest neighbor algorithm, Neural Networks (multilayer perceptron) and similarity learning.

Moreover, the one or more analytical artificial intelligence algorithms sometimes comprise one or more classification algorithms, which may include algorithms for pattern and sequence recognition, novelty detection and/or sequential decision making. Preferably, the one or more analytical artificial intelligence algorithms comprise ensemble learning algorithms, which are supervised meta-algorithms for combining multiple learning algorithms together, such as algorithms for boosting (meta-algorithm), bootstrap aggregating ("bagging"), ensemble averaging and mixture of experts, and hierarchical mixture of experts.

Optionally, the one or more analytical artificial intelligence algorithms implement or comprise naïve-bayes classifier and/or tree decision making model to identify the data with financial characteristics. Optionally, the Naïve Bayes classifier is a simple probabilistic model which assumes that the probability of various features occurring within a class are unrelated to the probability of the presence of any other feature or attribute, such as a financial attribute (financial characteristics) of words in a numerical value in a text statement such as "Cost Profit from continuing operations X %". This strong independent assumption allows Naive Bayes classifiers to assume that the effect of an individual attribute on a given class is independent of the values of the other attributes.

More optionally, the tree decision making model includes a "decision tree" is a cluster of nodes from macro nodes to micro nodes. Typically, a decision tree is used in a decision process with a set of available decisions that are subject to a series or set of tests that can be performed with known outcomes. The test outcomes are observed and a decision is made based upon these outcomes.

The processing unit 110 executes the processing instruction to cause the processing unit 110 to acquire response from the user for sequentially provided plurality of questionnaire sets. Throughout the present disclosure, the term questionnaire sets refer to a set of questions with a choice of answers, devised for the purposes of a survey or statistical study of various operating condition of the entity. Therefore, the plurality of questionnaire sets refers the plurality of sets of questions for survey or statistical study of various operating condition of the entity. Furthermore, each questionnaire set comprises plurality of queries associated with operation of the entity. In an example, the sets of questions may include audit strategy of the entity that may set out the scope, timing and direction of the audit which will guide the development of the audit plan. The audit strategy of the entity may include identifying the characteristics of the engagement that defines the scope; ascertaining objectives of the engagement to plan the nature, timing and extent of the audit, including the types of the communications required; considering the factors that, in the auditor's professional judgement, are significant in directing the engagement team's efforts, considering the results of preliminary engagement activities and, where applicable, whether knowledge gained on other engagements performed by the engagement partner for the entity is relevant and ascertaining the nature, timing and extent of resources necessary to perform the engagement. The set of questions for identifying the characteristics of the engagement that defines the scope may further include, but not limited to questions like if the engagement team required to audit/review any generally accepted accounting principles (GAAP) differences to another financial reporting framework, are there any industry-specific reporting requirements such as reports mandated by industry regulators, and the like. The set of questions for ascertaining objectives of the engagement to plan the nature, timing and extent of the audit, including the types of the communications required may further include, but not limited to questions like if the engagement team expected to have extensive, complicated, limited or restricted meetings with management and those charged with governance to discuss the nature, timing and extent of the audit work, if the engagement team expected to have extensive, complicated, limited or restricted discussion with management regarding the expected communications on the status of audit work throughout the engagement, and the like. The set of questions for considering the factors that, in the auditor's professional judgement, is significant in directing the engagement team's efforts. Considering the results of preliminary engagement activities and, where applicable, whether knowledge gained on other engagements performed by the engagement partner for the entity is relevant may further include, but not limited to questions like if there are any preliminary identification of areas where there may be a higher risk of material misstatement, if the impact of the assessed risk of material misstatement at the overall financial statement level on direction, supervision and review expected to be significant, and the like. The set of questions for ascertaining the nature, timing and extent of resources necessary to perform the engagement may further include, but not limited to questions like are there any challenges forming the engagement team (including, where necessary, the engagement quality control reviewer) or the assignment of audit work to the team members, including the assignment of appropriately experienced team members to areas where there may be higher risks of material misstatement, does the engagement team have concerns over the engagement budget, including considering the appropriate amount of time to set aside for areas where there may be higher risks of material misstatement and the like.

In another example, the sets of questions may include questions pertaining to understanding business environment of the entity that may include general entity background; relevant industry, regulatory, and other external factors including the applicable financial reporting framework; nature of the entity; entity's selection and application of accounting policies; entity's objectives, strategies, and related business risks; measurement and review of the entity's financial performance; other matters affecting the business; fraud and error; related party transactions and summarising specific risks affecting the entity arising from above risk assessment. The set of questions related to general entity background may further include, but not limited to questions like was the previous period's auditor's report qualified, was there any fundamental uncertainty in the previous period's auditor's report, and the like. The set of questions related to relevant industry, regulatory, and other external factors including the applicable financial reporting framework may further include, but not limited to questions related to industry factors like if the entity is in a highly competitive or volatile sector of the economy, if the entity is affected by cyclical or seasonal factors, and the like. The set of questions related to relevant industry, regulatory, and other external factors including the applicable financial reporting framework may further include, but not limited to questions related to regulatory factors like are there any sales commissions or agent's fees that appear excessive in relation to those ordinarily paid by the entity or in its industry or to the services actually received, are there any adverse media comment over the entity's business practice, and the like. The set of questions related to relevant industry, regulatory, and other external factors including the applicable financial reporting framework may further include, but not limited to questions related to external factors like are there any external factors (e.g. a potential listing or bank financing) which could influence expected results, is there any operating losses making the threat of bankruptcy, foreclosure, or hostile takeover imminent, and the like. The set of questions related to nature of the entity may further include, but not limited to questions related to operations like are there a large number of business locations and/or a wide geographical spread of its activities, if the entity reliant on only a few customers or suppliers, and the like. The set of questions related to nature of the entity may further include, but not limited to questions related to ownership and governance structures like if there a complex ownership structure, if there any instance where the monitoring of management is not effective as a result of the oversight by those charged with governance over the financial reporting process and internal control being not effective, and the like.

The set of questions related to nature of the entity may further include, but not limited to questions related to types of investments like were there any acquisitions, mergers or disposals of business activities in the period or after the year-end, does the entity have any investments in securities or loans, and the like. The set of questions related to nature of the entity may further include, but not limited to questions related to structure of entity and how it is financed like does the entity have a complex capital structure, are there any issues arising from the entity's debt structure, including covenants, restrictions, guarantees, or off-balance-sheet financing arrangements and the like. The set of questions related to entity's selection and application of accounting policies may further include, but not limited to questions related to whether the management has appropriately applied the requirements of the applicable financial reporting framework relevant to accounting estimates, if there are any changes from the prior period in the method for making accounting estimates are appropriate in the circumstances, and the like. The set of questions related to entity's objectives, strategies, and related business risks may further include, but not limited to questions related to whether the engagement has team reviewed a copy of the entity's long term strategy or business plan, if available, if there is any pressure to meet targets to check protection of the jobs of directors, management or other employees, and the like. The set of questions related to measurement and review of the entity's financial performance may further include, but not limited to questions related to whether the accounting records been reliable in the past, whether meaningful management accounts were prepared during the year, and the like. The set of questions related to fraud and error may further include, but not limited to questions related to if there are there any unusual financial or reporting pressures within the business, if there are there any significant weaknesses in the design or implementation of internal controls, and the like. The set of questions related to related party transactions may further include, but not limited to questions related to whether the entity is a member of a group that does not prepare group financial statements, if there are any significant related party transactions outside the normal course of business, and the like.

In another example, the sets of questions may include questions pertaining to internal controls of the entity that may include control environment, entity's risk assessment process, the information system, including the related business processes, relevant to financial reporting, and communication, control activities, monitoring of controls, significant business cycles and control deficiencies. The set of questions related to control environment may further include, but not limited to questions related to whether the management has created and maintained a culture of honesty and ethical behaviour, if there is a high tolerance for theft in the entity, and the like. The set of questions related to entity's risk assessment process may further include, but not limited to questions related to weather the entity's risk assessment process will be used in identifying relevant risks and the actions taken in response to them, and the like. The set of questions related to the information system, including the related business processes, relevant to financial reporting, and communication may further include, but not limited to questions related to whether the management information systems are in existence and effective, if the accounting records are kept up to date, and the like.

In another example, the sets of questions may include questions pertaining to defining risk consideration of the entity that may include risk assessment summary, financial statements level risk assessment, specific assertion level risk assessment and risk response summary. The set of questions related to risk response summary may further include, but not limited to questions related to financial statements level risk, specific assertion level risk, test of operating effectiveness of relevant internal controls, determining overall performance materiality and planning conclusion.

In another example, the sets of questions may include questions pertaining to calculating overall performance materiality of the entity that may include selection of benchmark for determining overall materiality, recommended materiality ranges for the respective benchmark, based on the evaluation considerations, how the benchmark and materiality percentage are calculated, determining clearly trivial threshold and final review of overall materiality.

In another example, the sets of questions may include questions pertaining to meeting with management of the entity that may include notes of planning meeting with management/those charged with governance which further includes agenda like obtaining updates on operations, industry, financial condition, management, finance team, regulatory compliance, accounting policies used, going concern etc., compliance with laws and regulations, and the like.

In another example, the sets of questions may include questions pertaining to suggested audit program & auditing procedure for of the entity. An audit program relates to a set of directions that the auditor and its team members follow for the proper execution of the audit. After preparing an audit plan, the auditor allocates the work and prepares a program which contains steps that the audit team needs to follow while conducting an audit. In another aspect, an audit procedure is used by auditors to determine the quality of the financial information being provided by their clients, resulting in the expression of an auditor's opinion. The exact audit procedure will depend on the nature of the business and the audit assertions that the auditors want to prove.

The plurality of queries in a given questionnaire set is generated based on responses provided by the user to the plurality of queries included in a questionnaire set that precedes the given questionnaire set. The processing instruction is configured to provide the plurality of questionnaire sets sequentially. In other words, the set of questions are provided one after another. In an example, a first questionnaire set, namely A1 may include questions N1, N2, N3, N4 and N5, and a second questionnaire set, namely A2 may include questions M1, M2, M3, M4 and M5. In such instance, the first questionnaire set is provided to the user to accept the response (inputs) via the computer arrangement 102, to the questions N1, N2, N3, N4 and N5. Thereafter, the provided inputs related to N1, N2, N3, N4 and N5 is analyzed and based on the analysis the second questionnaire set, namely A2 may include questions M1, M2, M3, M4 and M5 is provided to the user for response. It will be appreciated that based on the analysis the inclusion of the questions M1, M2, M3, M4 and M5 is determined. Optionally, the plurality of processing instruction including tree decision making model and/or neural-network based learning is used to analyze the response to the provided questions and determine the questions to be included in the consequent questionnaire set.

Optionally, the plurality of processing instruction comprises deep learning algorithms to sequentially provide plurality of questionnaire sets. Optionally, the deep learning algorithms may be implemented as a deep learning network model. The neural network model includes two or more hidden layers are called the deep neural network, generally known as the deep learning network model. The deep learning network model includes nonlinear transformation and transforms it into various forms combined by nonlinear operations, which is the accumulation of hidden layers in the model. In this way, the deep learning model has higher accuracy and better expression ability. Deep learning is a multi-level neural network model, wherein each layer of neural networks is under the unsupervised learning mechanism in the condition of pre-training. The training of the deep learning is carried out layer by layer, in other words, the output of the prior level is the input of next one. Training includes the use of "back propagation" algorithm, which makes use of partial differentiation of a "loss function" to update the layers of the neural network. Optionally, a "loss function" can be user defined and describes how accurate the neural network is in some mathematical forms. For example, the mean square of the error made in the neural network output can be used to describe the "loss function". As another example, the cross entropy of the neural network output can be used to describe the "loss function". Optionally, the use of "back propagation" algorithm has several variations. For example, adaptive learning rate optimization changes the learning rate parameter during "back propagation". As another example, stochastic gradient descent with momentum computes the exponentially weighted average of the gradient instead of the exact derivative of the "loss function", which helps in converging the neural network to an ideal solution. Furthermore, in training the deep neural network, a classifier is needed to accomplish supervised learning. Optionally, the algorithm more commonly used in the context of NLP and text analysis, is known to practitioners in the art as a recurrent neural networks (RNN). The deep learning algorithms analysis the questions and the corresponding responses and thereafter sequentially provide plurality of questionnaire sets. Generally, such deep learning RNNs use hidden computational "nodes" and various "gates," and require manipulation known in the art as "tuning." After the process of "tuning", the algorithm will be evaluated to assess the degree to which it accurately identifies the textual test data it has never before encountered with the "vector space" it has been trained to recognize. As one example, a Receiver Operating Characteristic (ROC) graph may be constructed and calculate the Area Under the Curve (AUC) score. An ROC graph measures true positives (on the y-axis) versus false positives (on the x-axis). Because the maximum AUC score is one (1.0), an ROC-AUC score in the mid-nineties, e.g., 0.95, indicates that there are far more true positives than false positives.

Optionally, the deep learning algorithms are configured to analyze a context of the response provided for each of the plurality of queries of each of the questionnaire set. The deep learning algorithms use various approaches to analyze the response provided for each of the plurality of queries of each of the questionnaire set. In an example, the deep learning algorithms generally analyze some corpus of texts by considering the whole vocabulary of each text. Popular methods of texts vectorisation, such as tfidf, word2vec or GloVe models may be used on the whole corpus's vocabulary to create its vector except of stop-words (such as articles, pronouns, and other quite generic language elements bringing little semantic sense in such a statistical averaging procedure). For example, to perform some analysis on a corpus of cash memo it would be important to extract financial terms or names classes from the texts.

Optionally, the deep learning algorithms are configured to implement decision tree. In an example, the deep learning algorithms may implement may use the decision tree for filtering the response provided for each of the plurality of queries of each of the questionnaire set. In such instance the decision tree may be used to filter relevant and non-relevant response.

Optionally, the deep learning algorithms are configured to include plurality of queries in a second questionnaire set based on the context of the response provided for each of the plurality of queries in the first questionnaire set that precedes the second questionnaire set. According to a aforementioned disclosure, wherein a first questionnaire set, namely A1 may include questions N1, N2, N3, N4 and N5, and a second questionnaire set, namely A2 may include questions M1, M2, M3, M4 and M5, and wherein the provided inputs related to N1, N2, N3, N4 and N5 is analyzed and based on the analysis the second questionnaire set, namely A2 may include questions M1, M2, M3, M4 and M5 is provided to the user for response. In such instance, the deep learning algorithms supported by the decision tree are implemented to analysis the context and determine a sentiment of the response of the user for the first questionnaire set namely A1 and subsequently include the questions in the second questionnaire set A2.

Optionally, the server arrangement further includes a database to ontologically store the response from the user for the sequentially provided plurality of questionnaire sets. Throughout the disclosure, the term 'database' as used herein relates to an organized body of digital information regardless of the manner in which the data or the organized body thereof is represented. Optionally, the database may be hardware, software, firmware and/or any combination thereof. For example, the organized body of related data may be in the form of a table, a map, a grid, a packet, a datagram, a file, a document, a list or in any other form. The database includes any data storage software and systems, such as, for example, a relational database like IBM DB2 and Oracle 9. Optionally, the database may be used interchangeably herein as database management system, as is common in the art. Furthermore, the database management system refers to the software program for creating and managing one or more databases. Optionally, the database may be operable to supports relational operations, regardless of whether it enforces strict adherence to the relational model, as understood by those of ordinary skill in the art. Additionally, the database populated by data elements. Furthermore, the data elements may include data records, bits of data, cells, are used interchangeably herein and all intended to mean information stored in cells of a database.

Throughout the present disclosure, the term "ontology" relates to a set of concepts (namely, information, ideas, data, semantic associations and so forth) in a field (namely, subject area, domain and so forth) that details types and properties of the set of concepts and semantic association thereof. Therefore, the ontologically store the response from the user for the sequentially provided plurality of questionnaire sets in the database refers to storing the response based on the information, ideas, data, semantic associations and so forth associated with each of the response.

Optionally, the database is an ontological database that provides a base for performing search to extract information in the form of search results pertaining to the field of interest of the user. Moreover, ontology provides a structured, optimal and relevant set of concepts along with their properties and relations in defined set of categories, pertaining to the field of interest of the user. Furthermore, ontology may be used in scientific research, academic studies, market analysis and so forth. Optionally, ontology may include concepts in form of text, image, audio, video, or any combination thereof.

The processing unit 110 executes the processing instruction to cause the processing unit 110 to analyze the acquired response from the user using artificial neural network to validate and train from the acquired response. The artificial neural network refers to a network system established by artificial methods of simulating functions and structures in human beings' brain system through numerous utilization of processing components such as the processing unit 110. The artificial neural networks can be also understood as a kind of structural mode in which the distributed parallel information is processed by the processing units (artificial neurons, etc.). As used herein, artificial neural network is a computing paradigm loosely modeled after cortical structures of the brain, and includes interconnected processing elements or neurons. These neurons work together to produce an output function that relies on the cooperation of individual neurons within the network in order to operate. The artificial neural networks are constructed in fixed arrays of neural elements or neurons with a limited ability to distribute weight values among the neurons. The architecture of the network is selected with a particular problem in mind, because different configurations are used to work different kinds of problems. While one of these configurations may be able to learn to solve a particular problem, such as understanding the sentiment of the response provide be the user for a provided question/query in the plurality of questionnaire set, it will not be as useful for other tasks.

Furthermore, the analyzing the response provided be the user for a provided question/query includes validating the response. In other words, the artificial neural network is configured to check if the provided response is appropriate for the provided question/query. Optionally, in the event wherein the provided response is appropriate for the provided question/query the artificial neural network may be configured to instruct appropriate related algorithms to store the response in the database ontologically.

Optionally, in the event wherein the provided response is not appropriate for the provided question/query the artificial neural network may be configured to instruct appropriate related algorithms to repeat the provided question/query or influence the selection of the plurality of queries in a questionnaire set that follows the questionnaire set including the provided question/query.

The training of the artificial neural network refers to the understanding of the response of provided by the user and using the knowledge of the same in solving a problem. In an example, the artificial neural network may be trained based on the data that is ontologically stored in the database. Furthermore, the training a neural network may include providing a first training dataset of crisp input and crisp output pairs; fuzzifying crisp outputs of said first training data base to create a second training dataset of crisp input and fuzzified output pairs; and training the neural network with said crisp input and fuzzified output pairs to solution convergence. The crisp outputs are fuzzified in accordance with a predetermined nearness relationship between different crisp outputs.

Optionally, the system further includes an artificial neural network processing module for training and validating the operation of the artificial neural network, the artificial neural network processing module comprises an artificial neural network training module for processing the acquired response from the user based on a predefined set of parameters, and determine a set of operating coefficients to be used by the artificial neural network when determining validity of the acquired response to the plurality of queries. The artificial neural network processing module is implemented as a logical module that is configured to perform the processing associated therein. Optionally, the logical module is configured to define and consider a predefined set of parameters. The predefined set of parameters refers to plurality of rules or guidelines of that may be used to understand the validity of a response of user. For example, one of the parameter may be, in the event wherein for a specific question is provided as with a non-numeric value the predefined parameter may be configured to consider the response as non-valid. Similarly, in the event wherein for a specific question is provided as with a numeric value the predefined parameter may be configured to consider the response as valid. Furthermore, the logical module may be configured to create set of operating coefficients wherein each coefficient may be weights associated to a received response that may be used to determine how much input value is associated with response. Such set of operating coefficients may be used to create a map(s) may that can be used to solve a problem, such understanding a response for a question provided by a user and thereupon determine a validity of a response.

Optionally, system further includes an artificial neural network processing module for training and validating the operation of the artificial neural network, the artificial neural network processing module comprises a response data history data store for maintaining all of the response provided by the user corresponding to the plurality of queries. The response data history data store refers to a local memory that may be used to store the response provided by the user corresponding to the plurality of queries. Furthermore, such data history data store may be configured to store the map(s) may that can be used to solve a problem, such understanding a response for a question provided by a user and thereupon determine a validity of a response. Optionally, such data history data store may be stored the database that may be configured to operate with the system 100 locally or remotely. In such instance, the response provided by the user corresponding to the plurality of queries is ontologically stored.

Optionally, the artificial neural network training module is adapted to train and validate the operation of the artificial neural network used on the operating coefficients generated and the response from the user in real-time. Optionally, the artificial neural network processing module is configured to process the response from the user in real-time. In other words, the artificial neural network processing module is configured to analyze the response from the user in real-time and generates operating coefficients to be used by the artificial neural network when determining validity of the acquired response to the plurality of queries and subsequently create a map that may be used to solve problems, such understanding a response for a question provided by a user and thereupon determine a validity of a response, influence the inclusion of questions to be provided to the user, or other necessary operation of the system 100.

The processing unit 110 executes the processing instruction to cause the processing unit 110 to analyze the machine-coded output using the trained artificial neural network and external financial data. The external financial data refers to the financial data that may be acquired or obtained or received from outside. The external financial data is obtained and received from a third-party. The term "third-party" refers to a third-party that provides data content analysis services. Such a third-party may be an individual, but is more likely a group of individuals, who review, or preview data content prior to that content being provided to a particular user, prior to that data content being accessed by a particular user, etc. The third-party may be affiliated with a particular area of interest for global financial trends. The third-party may be selected from a plurality of potential third-parties, for example, dedicated financial program reviewing organizations, financial educational organizations, or special interest organizations. Optionally, the third-party may be trusted third-party that regularly monitors domain based financial conditions and trends of the international market and the generates reports describing the global financial data including data that can be used to identify and analyze various financial device (such as overall materiality, risk, and the likes) of an entity. The trained artificial neural network may be configured to consider the external financial data while analyzing the machine-coded output. For example, the operating coefficients that are used to train the artificial neural network may be influenced by the external financial data acquired from the third-party. Optionally, the trained artificial neural network is configured to use the external financial data and the calculated risk value for the entity to analysis the response acquired from the user. In an example, the trained artificial neural network may consider the reports describing the global financial data and the calculated risk value (using the reply of the user provided in the plurality of questionnaire sets) to analysis the response acquired from the user in the form of user inputs. Optionally, the trained artificial neural network is configured to iteratively calculate an industrial benchmark for the entity based on user inputs. In an example, iteratively calculate an industrial benchmark for the entity based on user inputs may refer generating an industrial benchmark by evaluating the user inputs, and thereafter repeating the evaluation of the user inputs to error check the calculated industrial benchmark. Optionally, the trained artificial neural network is configured to the identify data with financial characteristics included in the machine-coded output generated by the automated machine learning module. In an example, the trained artificial neural network is configured use one or more logics to identify the financial characteristics included in the machine-coded output.

The processing unit 110 executes the processing instruction to cause the processing unit 110 to generate a first user interface to display a first machine-coded questionnaires for the entity. The first user interface refers to a structured set of user interface elements rendered on a display screen. Optionally, the first user interface rendered on the display screen (of the computing device 104) is generated by any collection or set of instructions executable by an associated digital system. Additionally, the first user interface is operable to interact with the user to convey graphical and/or textual information and receive input from the user. Specifically, the first user interface used herein is a graphical user interface (GUI). Furthermore, the first user interface elements refer to visual objects that have a size and position in first user interface. A user interface element may be visible, though there may be times when a user interface element is hidden. A user interface control is considered to be a user interface element. Text blocks, labels, text boxes, list boxes, lines, and images windows, dialog boxes, frames, panels, menus, buttons, icons, etc. are examples of user interface elements. In addition to size and position, a user interface element may have other properties, such as a margin, spacing, or the like.

The first user interface displays the first machine-coded questionnaires for understanding, defining, calculating or suggesting various conditions of the entity. The questionnaires comprise plurality of risk assessment parameters. Specifically, questionnaires may include questions/queries related to a set of procedures elements/components in the entity that may be used to identify assurance risk. The questionnaires may be logic supported to determine one or more condition in the entity. In an example, the questions/queries may be related to business environment of the entity. In such instance, if a response to the questions/queries related to business environment of the entity refers to dynamic business environment; it would be considered that the business entity involves high risk. It will be appreciated that risk assessment parameters may be include the questions related to the risk consideration, risk assessment of the entity.

Optionally, the first machine-coded questionnaires may include machine-coded questionnaires related to (as described above) audit strategy of the entity, business environment of the entity, internal controls of the entity, overall performance materiality (level) of the entity, meeting with management of the entity, audit program and auditing procedure for the entity.

The processing unit 110 executes the processing instruction to cause the processing unit 110 to acquire at least one input from the user for at least one risk assessment parameter of the plurality of risk assessment parameters to further validate and train the trained artificial neural network. The at least one input from the user for at least one risk assessment parameter of the plurality of risk assessment parameters is provided by the user using the computer arrangement 102. Specifically, the user uses the computing device 104 to provide the at least one input. The inputs provided by the user describe information related to the least one risk assessment parameter of the plurality of risk assessment parameters. Optionally, inputs provided by the user describes information related to the audit strategy of the entity, business environment of the entity, internal controls of the entity, overall performance materiality (level) of the entity, meeting with management of the entity, auditing procedure for the entity. Such provided inputs are considered by the artificial neural network to further validate and train itself.

The processing unit 110 executes the processing instruction to cause the processing unit 110 to generate a second user interface to display a second machine-coded questionnaires for the entity incorporating the at least one input associated with the at least one risk assessment parameter. The second user interface is similar to the first user interface, wherein the second user interface refers to a structured set of user interface elements rendered on a display screen. Optionally, the second user interface rendered on the display screen (of the computing device 104) is generated by any collection or set of instructions executable by an associated digital system. Additionally, the second user interface is operable to interact with the user to convey graphical and/or textual information and receive input from the user. Specifically, the second user interface used herein is a graphical user interface (GUI). Furthermore, the second user interface elements refer to visual objects that have a size and position in second user interface. A user interface element may be visible, though there may be times when a user interface element is hidden. Additionally, the display a second machine-coded questionnaires for the entity incorporating the at least one input associated with the at least one risk assessment parameter. Optionally, the second machine-coded questionnaires for the entity may not include questions/queries that are not included in the first machine-coded questionnaires. More optionally, the second machine-coded questionnaires for the entity may partially include questions/queries that are not included in the first machine-coded questionnaires.

Optionally, at least instruction of the plurality of processing instruction is implemented as a machine learning algorithm configured to generate a risk summary for the entity. In an example, the risk summary describes the financial statements level risk and the specific assertion level risk. In such instance the financial statements level risk may be described as low, medium or high. Furthermore, the specific assertion level risk may describe the description of risk identified, financial statements account affected, assertion affected, risk of material misstatements classification, and the like.

Optionally, the generated risk summary comprises plurality of risk calculating parameter. In an example, the risk calculating parameter refers to the measures, information or device that can be used to calculate risk. The plurality of risk calculating parameter may include financial statements level risk including list of risk, RMM classification, proposed risk response, and corresponding outcome and the like. Optionally, the artificial neural network may be configured to consider risk response including audit approach, customized audit program and the like, based on the generated risk summary upon confirmation from the user. It will be appreciated that the confirmation from the user may be provided by the user as a user input.

Optionally, the machine learning algorithm is configured to analyze the response acquired from the user for sequentially provided plurality of questionnaire sets for generating the risk summary for the entity. In an example, the response acquired from the user as user input for the first machine-coded questionnaires is considered by the machine learning algorithm to sequentially provided plurality of questionnaire sets for generating the risk summary for the entity. In such instance, the machine learning algorithm is configured to analyze the sentiment of the response. Optionally, the generated risk summary for the entity is ontologically stored in the database. In an example, the generated risk summary for the entity is stored ontologically in relation to the response provided by the user that is stored in the database.

Optionally, the at least one processing unit is further configured to calculate an overall materiality level of the entity. Optionally, the at least one processing unit is configured to use the trained artificial neural network to analysis the response acquired from the user for sequentially provided plurality of questionnaire sets for calculating the overall materiality level of the entity. In an example, the analysis the response acquired from the user in the form of user inputs to the question related to the audit strategy, business environment, internal controls of the entity, risk consideration, and the likes to determine the overall materiality level of the entity. Optionally, the trained artificial neural network is configured to calculate a threshold value and a materiality level for analyzing the response acquired from the user for sequentially provided plurality of questionnaire sets. In an example, threshold value and a materiality level may be numerical in value that can be used to analyzing the response acquired from the user and subsequently sequentially provided plurality of questionnaire sets to the user.

In exemplary embodiment, the system 100 may include an environment for enabling identification and/or recognition of financial statements, in accordance with a non-limiting embodiment of the present disclosure. The environment comprises the system and the cognition AI (cloud). The system is communicatively coupled with the cognition AI via a communication network. The user browses and/or uploads the soft copy of financial statement and/or report to the system. Thereafter, the system scans the financial report with the cognition AI, which is sometimes or commonly known as Vision AI (Artificial Intelligence). Further, the cognition AI shall on the basis of optical character recognition (OCR) model and reference from key factors matches the data with database. In case the system matches the relevant data with database, the system will place the relevant data to corresponding accounts and financial data. Optionally, if the system doesn't match the relevant data, the user shall suggest or manually tag the correct data. Thereafter, on the basis of the outcome, the AI shall learn and compare with the industrial data to identify the highest-scoring profile, and accordingly filters the irrelevant data. Simultaneously, it provides an update to the AI for matching the data with the database, on the basis of the OCR model and reference from key factors. It is pertinent to mention that the present environment may be implemented in a computerized environment such as the system shown in FIG. 1.

In exemplary embodiment, the system 100 may include an environment wherein horizontal cascade, for intelligently automating the audit planning process effectively and efficiently, eliminating the inconsistency, human fraud and personal judgement is performed. Further, it also reflects that by answering the fundamental questionnaires, less experienced users are also able to complete the audit planning with compliance to standard. The environment comprises the system and a AI (cloud). The system is communicatively coupled with the AI (cloud) via a communication network. The system only retrieves the relevant questionnaires from the database and on the basis of the users input, the system feeds answer to the questionnaires. Thereafter, on the basis of AI calculation, the data shall flow to an appropriate module of the system and shall affect the outcome and/or derivative questionnaire. It is pertinent to mention that the present environment may be implemented in a computerized environment such as the system shown in FIG. 1.

In exemplary embodiment, the system 100 may include an environment wherein vertical cascade, for intelligently automating the audit planning process effectively and efficiently, eliminating the inconsistency, human fraud and personal judgement is performed. Further, it also reflects that by answering the fundamental questionnaires, less experienced users are also able to complete the audit planning with compliance to standard. The environment comprises the system and the AI (cloud). The system is communicatively coupled with the AI (cloud) via a communication network. The system only retrieves the relevant questionnaires from the database and on the basis of the users input, the system feeds a definite answer to the questionnaires. Thereafter, the outcome is generated on the basis of AI calculation, wherein the AI calculates every output of the user's answer through AI algorithm. Simultaneously, a feedback is provided to the system for retrieving the relevant questionnaires from the database. It is pertinent to mention that the present environment may be implemented in a computerized environment such as the system shown in FIG. 1.

In exemplary embodiment, the system 100 may include an environment for allowing a junior module to calculate materiality easily, with only answering AI designed and/or suggested questionnaires. The environment comprises the system, the AI, the cognition AI and AI calculation module. The system is communicatively coupled with the AI, the cognition AI and the AI calculation module via a communication network. The system only retrieves the relevant questionnaires from the database and accordingly, the user feeds input to the questionnaires. In case the question retrieved is exclusive, the system again attempts to retrieve the relevant questionnaires from the database on the basis of the feedback provided. Optionally, if the question retrieved is not exclusive, the AI calculates and suggests an industrial benchmark. Thereafter, the user shall review the suggested industrial benchmark. Furthermore, in the event wherein the user declines the suggested industrial benchmark, accordingly, the user shall select another benchmark and shall provide the reason. On the basis of the aforesaid, AI learns the behavioural science to the answer, compare with the industrial data to identify the highest-scoring profile and filter the irrelevant data. Simultaneously, it provides an update for calculation and suggestion of the industrial benchmark. Optionally, if the user accepts the suggested industrial benchmark, the system shall retrieve the relevant questionnaires from the database based on the selected benchmark and accordingly, the user feeds input to the questionnaires. Thereafter, the AI shall calculate threshold and materiality percentage based on the user's input taken into consideration of industrial benchmark. Simultaneously, the cognition AI pulls the relevant data into the system. Accordingly, the AI calculates the overall materiality. It is pertinent to mention that the present environment may be implemented in a computerized environment such as the system shown in FIG. 1.

In exemplary embodiment, the system 100 may include an environment wherein based on user's input, AI shall suggest the relevant and most appropriate audit approach to the user. The environment comprises the system and the AI (cloud). The system is communicatively coupled with the AI (cloud) via a communication network. The system only retrieves the relevant questionnaires from the database and accordingly, the user feeds input to the questionnaires. Thereafter, the AI shall calculate and suggest the audit approach based on highest scoring profile. Optionally, if the suggested audit approach is declined, accordingly, the user may select another audit approach or feed input manually. On the basis of the aforesaid, AI learns from the outcome and compare with the industrial data to identify the highest-scoring profile and filter the irrelevant data. Simultaneously, it provides an update for calculating and suggesting the audit approach based on highest scoring profile. Optionally, if the suggested audit approach is accepted, the system shall place the relevant data corresponding to the accounts and financial data. It is pertinent to mention that the present environment may be implemented in a computerized environment such as the system shown in FIG. 1.

In exemplary embodiment, the system 100 may include an environment for allowing an amateur user in completing the planning effectively and efficiently. The environment comprises the system and the AI (cloud). The system is communicatively coupled with the AI (cloud) via a communication network. The system only retrieves the relevant questionnaires from the database and accordingly, the user feeds input to the questionnaires. Thereafter, the AI shall calculate every outcome of the user's input on the basis of the AI algorithm. Simultaneously, a feedback is provided to the system for retrieving the relevant questionnaires from the database. It is pertinent to mention that the present environment may be implemented in a computerized environment such as the system shown in FIG. 1.

In exemplary embodiment, the system 100 may include an environment for allowing an amateur user in identifying the audit risk effectively and efficiently. The environment comprises the system and a AI-IRA (cloud). The system is communicatively coupled with the AI-IRA (cloud) via a communication network. The system only retrieves the relevant questionnaires from the database and accordingly, the user feeds input to the questionnaires. Thereafter, the AI identifies relevant input provided by the user and calculates the risk on the basis of Intelligence Risk Algorithm. Further, aforesaid shall update the relevant database and eventually the system shall place the relevant data to corresponded module. It is pertinent to mention that the present environment may be implemented in a computerized environment such as the system shown in FIG. 1.

Figure 2:
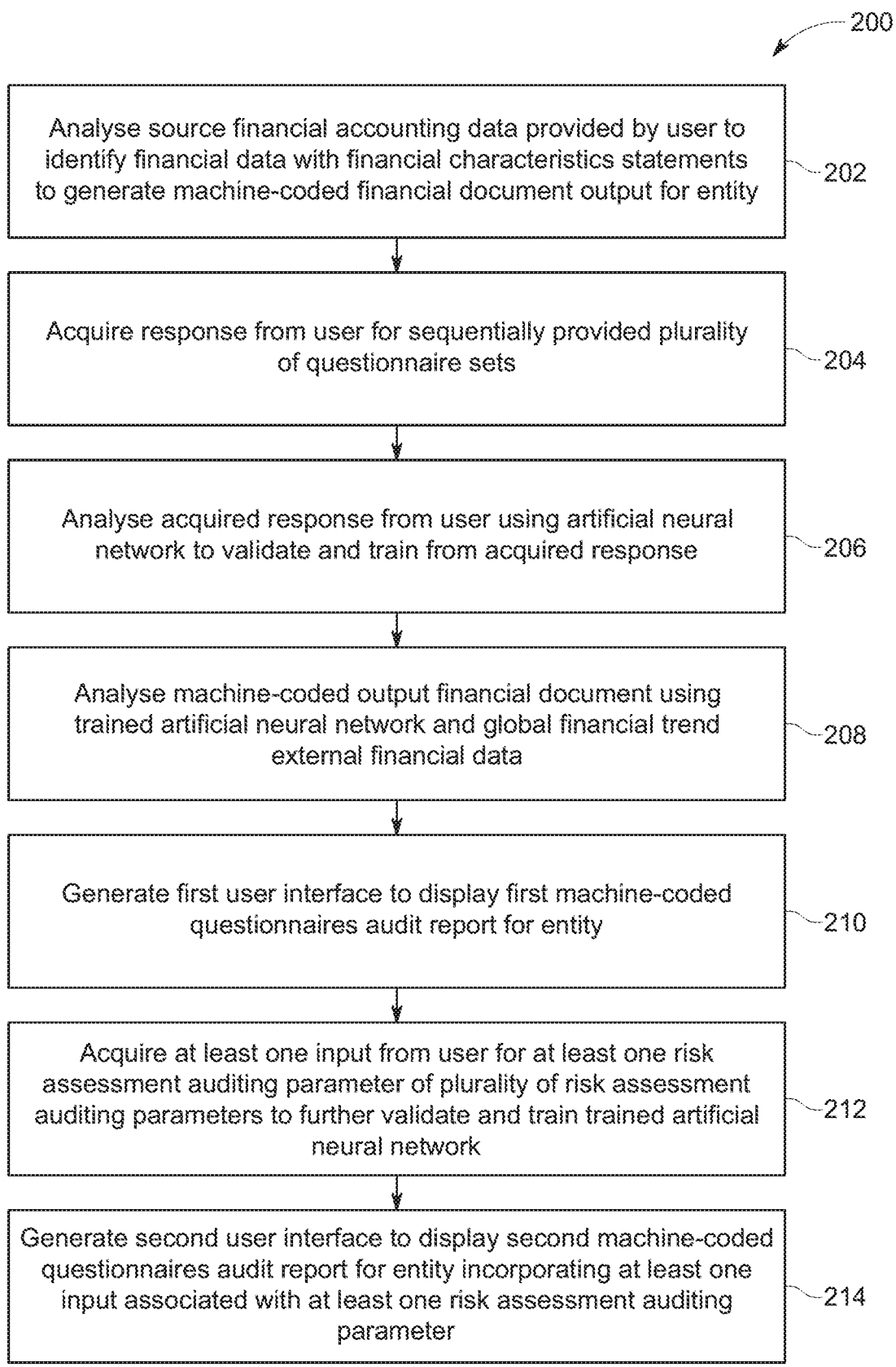
FIG. 2 is an illustration of steps of a method for generating an audit report assurance related planning process and documents for an entity, in accordance with a non-limiting embodiment of the present disclosure.

Referring to FIG. 2, there is shown steps of a method 200 for generating an audit report assurance related planning process and documents for an entity, in accordance with a non-limiting embodiment of the present disclosure. The method 200 is implemented via a system (such as the system of FIG. 1). At step 202, source data provided by a user is being analyzed. The source data is being analyzed for identifying financial data with financial nature and/or characteristics statements for generating a machine-coded financial document output for the entity including the identified financial data with financial nature and/or characteristics statements. At a step 204, response from the user for sequentially provided plurality of questionnaire sets, is being acquired. The plurality of questionnaire sets comprises plurality of queries associated with operation of the entity, wherein the plurality of queries in a given questionnaire set is generated based on responses provided by the user to the plurality of queries included in a questionnaire set that precedes the given questionnaire set. At a step 206, the acquired response from the user is being analyzed. The analysis is performed using an artificial neural network for validating and training from the acquired response. At a step 208, the machine-coded output financial document is being analyzed. The analysis is performed using the trained artificial neural network and global financial trend external financial data. The global financial trend external financial data is obtained or received from a third-party. At a step 210, a first user interface is generated. The first user interface is configured to display a first machine-coded questionnaires audit report for the entity. The questionnaires audit report comprises plurality of risk assessment auditing parameters. At a step 212, at least one input from the user is being acquired. The acquired at least one input from the user is configured for at least one risk assessment auditing parameter of the plurality of risk assessment auditing parameters for further validating and training the trained artificial neural network. At a step 214, a second user interface is being generated. The second user interface is configured to display a second machine-coded questionnaires audit report, for the entity incorporating the at least one input associated with the at least one risk assessment auditing parameter.

It is contemplated that one or more steps can be performed separately or together, at a same time or at different times, at a same location or at different locations, and/or in the illustrated order or out of order. Furthermore, it is contemplated that one or more steps can be optionally omitted. In an example, the financial accounting source data are images, machine-coded documents, or combination thereof. In another example, the system uses automated machine learning module to identify financial data with financial nature/ characteristics statements to generate a machine-coded financial output document for the entity. In yet another example, the financial accounting source data are analyzed using plurality of analytical artificial intelligence algorithms. In yet another example, the plurality of analytical artificial intelligence algorithms implements naïve-bayes classifier and/or tree decision making model to identify the financial data with financial nature/characteristics statements. In yet another example, the plurality of questionnaire sets is related to at least one of define audit strategy of the entity, understanding business environment of the entity, understanding internal controls of the entity, define risk consideration of the entity, calculate overall materiality (level) of the entity, meeting with management of the entity, suggested audit program & auditing procedure to the entity, business environment of the entity, internal controls of the entity, risk consideration of the entity, performance materiality of the entity, and auditing procedure of the entity. In yet another example, the plurality of processing instruction comprises deep learning algorithms to sequentially provide plurality of questionnaire sets. In yet another example, the deep learning algorithms is configured to analyze a context of the response provided for each of the plurality of queries of each of the questionnaire set. In yet another example, the deep learning algorithms is configured to implement decision tree. In yet another example, the deep learning algorithms is configured to include plurality of queries in a second questionnaire set based on the context of the response provided for each of the plurality of queries in the first questionnaire set that precedes the second questionnaire set. In yet another example, the system further includes an artificial neural network processing module for training and validating the operation of the artificial neural network, the artificial neural network processing module comprising an artificial neural network training module for processing the acquired response from the user based on a predefined set of parameters, and determine a set of operating coefficients to be used by the artificial neural network when determining validity of the acquired response to the plurality of queries, and a response data history data store for maintaining all of the response provided by the user corresponding to the plurality of queries. In yet another example, the artificial neural network training module is adapted to train and validate the operation of the artificial neural network used on the operating coefficients generated and the response from the user in real-time. In yet another example, at least instruction of the plurality of processing instruction is implemented as a machine learning algorithm configured to generate a risk summary for the entity. In yet another example, the generated risk summary comprises plurality of risk calculating parameter. In yet another example, the machine learning algorithm is configured to analyze the response acquired from the user for sequentially provided plurality of questionnaire sets for generating the risk summary for the entity. In yet another example, the generated risk summary for the entity is ontologically stored in the database. In yet another example, the at least one processing unit is further configured to calculate an overall materiality level of the entity. In yet another example, the at least one processing unit is configured to use the trained artificial neural network to analysis the response acquired from the user for sequentially provided plurality of questionnaire sets for calculating the overall materiality level of the entity. In yet another example, the trained artificial neural network is configured to use the external financial trend financial data and the calculated risk value for the entity to analysis the response acquired from the user. In yet another example, the trained artificial neural network is configured to iteratively calculate an industrial benchmark for the entity based on user inputs. In yet another example, the trained artificial neural network is configured to calculate a threshold value and a materiality percentage level for analyzing the response acquired from the user for sequentially provided plurality of questionnaire sets and the identify financial data with financial nature/ characteristics statements included in the machine-coded financial document output generated by the automated machine learning module. In yet another example, wherein the plurality of risk assessment auditing parameters includes at least one of audit strategy of the entity, business environment of the entity, internal control of the entity, meeting with management of the entity, preliminary analytical review of the entity, overall materiality of the entity, risk consideration of the entity, assertion level risk assessment of the entity, and financial statements risk assessment of the entity.—materiality of the entity, risk consideration of the entity, and sample size of the entity. In yet another example, the second first machine-coded questionnaires audit report for the entity further comprises an audit strategy. In yet another example, the audit strategy includes scope size of the audit, timing range of the audit, and direction of the audit.

Optionally, the plurality of auditing parameters may further include, but not limited to performance materiality level of the entity, sample size risk consideration of the entity and sample size customized audit program for the entity. The parameters pertaining to performance materiality level of the entity may comprise selection of benchmark for determining overall materiality, recommended materiality ranges for the respective benchmark, based on the evaluation considerations, the selected benchmark and materiality percentage are appropriate, determining clearly trivial threshold and final review of overall materiality. The parameters pertaining to sample size risk consideration of the entity may include sampling risk, the tolerable error and the expected error. The parameters pertaining to sample size customized audit program for the entity.

Optionally, the plurality of risk assessment auditing parameters may further include, but not limited to audit strategy of the entity, business environment of the entity, internal control of the entity, meeting with management of the entity, preliminary analytical review of the entity, overall materiality of the entity, risk consideration of the entity, assertion level of risk assessment of the entity and financial statements risk assessment of the entity. The audit strategy of the entity may include identifying the characteristics of the engagement that defines the scope; ascertaining objectives of the engagement to plan the nature, timing and extent of the audit, including the types of the communications required; considering the factors that, in the auditor's professional judgement, are significant in directing the engagement team's efforts, considering the results of preliminary engagement activities and, where applicable, whether knowledge gained on other engagements performed by the engagement partner for the entity is relevant and ascertaining the nature, timing and extent of resources necessary to perform the engagement. The business environment of the entity may include general entity background; relevant industry, regulatory, and other external factors including the applicable financial reporting framework; nature of the entity; entity's selection and application of accounting policies; entity's objectives, strategies, and related business risks; measurement and review of the entity's financial performance; other matters affecting the business; fraud and error; related party transactions and summarising specific risks affecting the entity arising from above risk assessment. The internal control of the entity may include control environment, entity's risk assessment process, the information system, including the related business processes, relevant to financial reporting, and communication, control activities, monitoring of controls, significant business cycles and control deficiencies. The meeting with management of the entity may include notes of planning meeting with management/those charged with governance which further includes agenda like obtaining updates on operations, industry, financial condition, management, finance team, regulatory compliance, accounting policies used, going concern etc., compliance with laws and regulations. The overall performance materiality of the entity may include selection of benchmark for determining overall materiality, recommended materiality ranges for the respective benchmark, based on the evaluation considerations, how the benchmark and materiality percentage are calculated, determining clearly trivial threshold and final review of overall materiality. The risk consideration of the entity may include risk assessment summary, financial statements level risk assessment, specific assertion level risk assessment and risk response summary. Assertion level of the risk assessment of the entity may depend upon the implicit or explicit claims and representations made by the management responsible for the preparation of financial statements regarding the appropriateness of the various elements of financial statements and disclosures.

Optionally, the audit strategy may further include, but not limited to scope size of the audit, timing range of the audit and direction of the audit. The scope size of the audit may define the amount of time and documents which are involved in an audit. The timing range of the audit may refer to when audit procedures are performed or the period or date to which the audit evidence applies and the direction of the audit refers to the guideline that can be used to implement the audit strategy.

Figure 3:
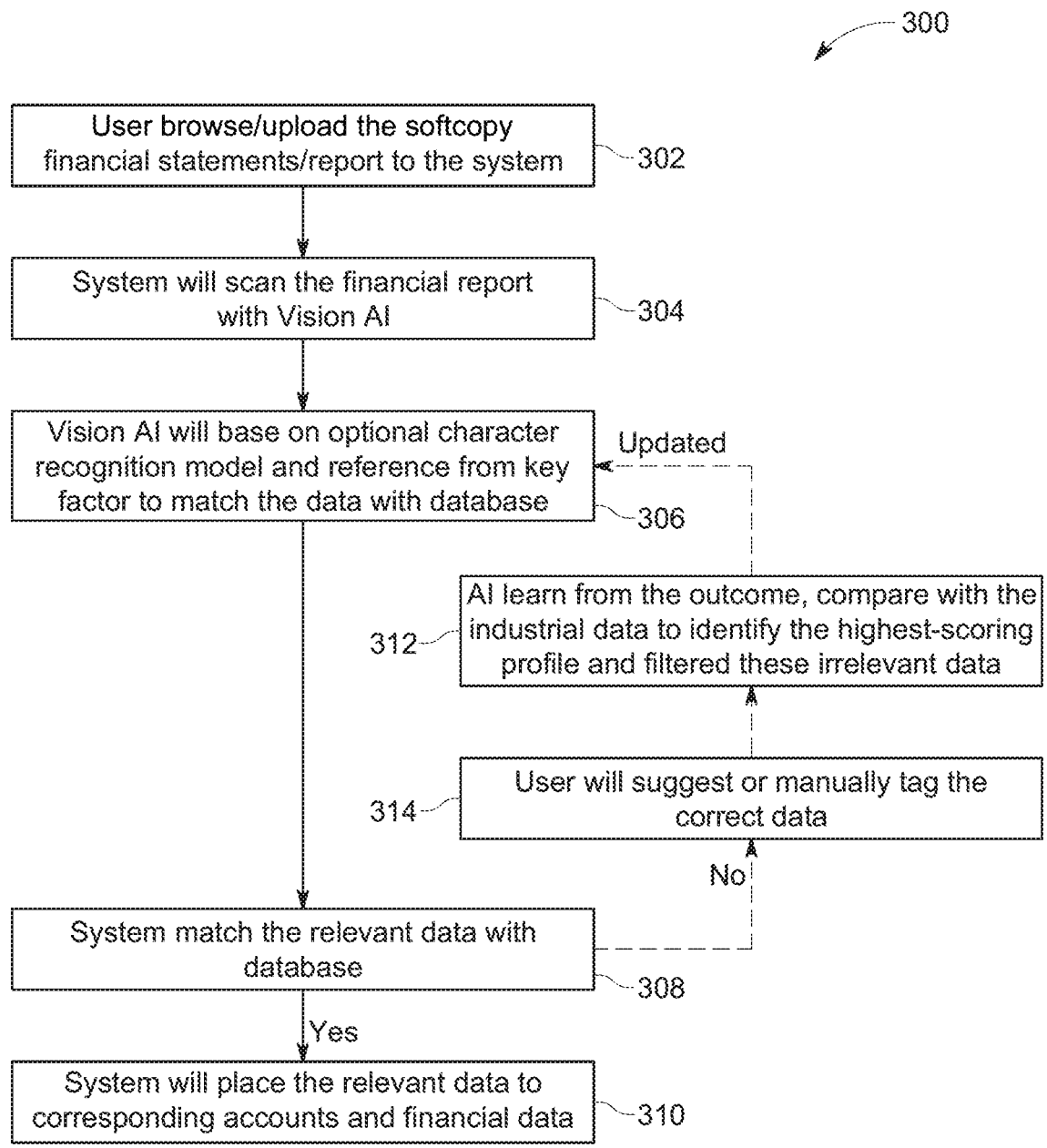
FIG. 3 is an illustration of analyze of the source data to identify data with financial characteristics to generate a machine-coded output, in accordance with a non-limiting embodiment of the present disclosure.

Referring to FIG. 3, there is shown analyze 300 of the source data to identify data with financial characteristics to generate a machine-coded output, in accordance with a non-limiting embodiment of the present disclosure. At 302, the system (such as the system 100 of FIG. 1) is implemented in a manner that the system provides the user a menu-driven interface for prompting browsing and/or uploading of a softcopy of financial statements/report to the system via a computing device. In an example, the menu-driven interface may include one or more graphical elements therein to enable browsing and/or uploading of the softcopy of the financial statements/report. Furthermore, browsing and/or uploading the softcopy of the financial statements/report refers to one or more action of a user in the computing device that involves scrutinizing through drives, shares, and folders on a computing device for a file that includes financial statements/report, and subsequently providing the financial statements/report to the system using one or more computing device enabled action, namely selecting and uploading the financial statements/report therein using a graphical elements such as a input field. At 304, the system will scan the financial statements/report with Cognition AI. In an example, scanning the financial statements/report with Cognition AI refers to the process of collecting content of the uploaded financial statements/report for the purpose of generating an electronic representation of the content in the financial statements/report in the form of text or image. At 306, the system the Cognition AI will base on optional character recognition model and reference from key factor to match the data with database. Optionally, the optional character recognition model is configured to examine uploaded financial statements/report and identify financial information. The identification process may include detection of a field having specific focus, namely financial data, observing the financial data in that field, and detecting when the current focus changes. Optionally, the current focus changes optical character recognition for that field can be completed. Further, optional character recognition model also recognize data received in various field of the uploaded financial statements/report, such as form titles, certificates, metadata, etc. Optional character recognition model may be applied each time focus is changed from one field to another, after subsets of fields are completed, or after an entire form is ready for submission. As discussed elsewhere herein, a flag is optionally used to indicate changes in focus or form submission, to optional character recognition model. Furthermore, the financial information in the uploaded financial statements/report that is identified using the optional character recognition model is configured to be referenced by key factor. Subsequently, the key factor may be used to match to already structurally stored data in the database (such as the database mentioned in system 100) to identify the nature of the data. At 306, the system matches the relevant data with database. Optionally, the system may use one or more instructions, modules or routine stored in a storage unit (such as at least one memory unit 112) to match the key factor with the already structurally stored data in the database (such as the database mentioned in system 100) to identify the nature of the data (financial data). Subsequently, at 306 the system will place the relevant data to corresponding accounts and financial data. For example, if the nature of the data is determined to be asset to the entity (such as the entity mentioned in system 100) then the system may be configured to present the data under an asset classification, such as the data may be classified as income in the machine-coded output of the entity. In another example, if the nature of the data is determined to be asset to the entity (such as the entity mentioned in system 100) then the system may be configured to present the data under a liability classification, such as the data may be classified as expenditure in the machine-coded output of the entity. Furthermore, at 308, in the event wherein the system is unable to match the financial data identified in the financial statements/report with the relevant data with database, the user is provided with a means to suggest or manually tag the correct data at 314. Thereafter at 312 the artificial algorithm implemented in the server arrangement is configured to learn from the outcome, compare with the industrial data to identify the highest-scoring profile and filtered these irrelevant data. It is contemplated that one or more steps can be performed separately or together, at a same time or at different times, at a same location or at different locations, and/or in the illustrated order or out of order. Furthermore, it is contemplated that one or more steps can be optionally omitted.

Figure 4:
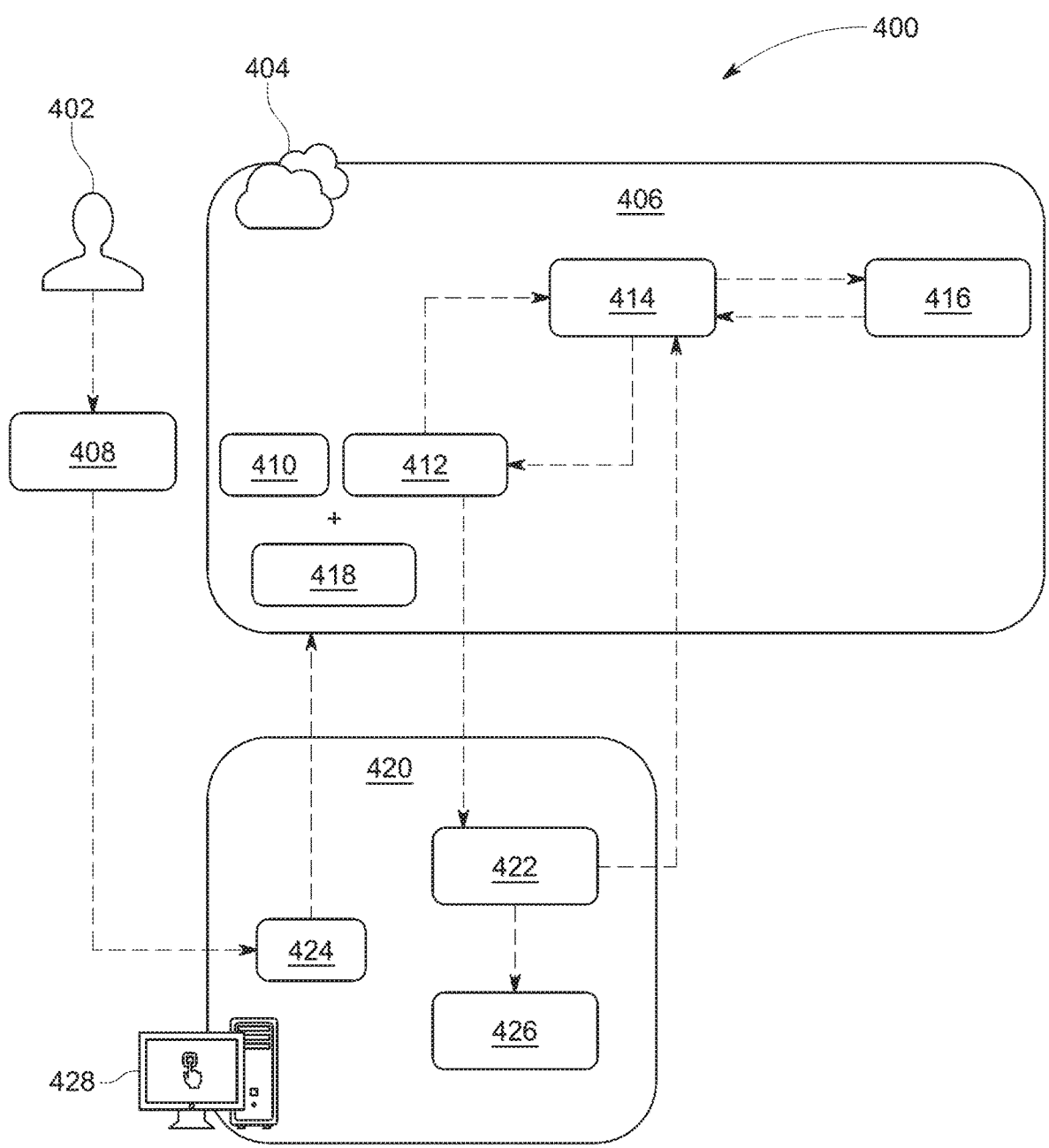
FIG. 4 is an illustration of a computing environment to implement analyze of the source data to identify data with financial characteristics to generate the machine-coded output.

Referring to FIG. 4, there is shown a computing environment 400 to implement analyze of the source data to identify data with financial characteristics to generate the machine-coded output, in accordance with a non-limiting embodiment of the present disclosure. As shown the computing environment 400 depict a user 402, a cloud architecture 404, financial statements/report 408, and computer arrangement 420. The cloud architecture 404 includes a processing platform 406 that comprises of OCR model 410, database 412, key factors 418, training module 414 and industrial data 416. The computer arrangement 420 includes computing device 428, matching module 422, data reading module 424, and generating module 426. It will be appreciated that the aforementioned components of the computing environment 400 are associated with one another in a manner that the computing environment 400 is enabled to analyze of the source data to identify data with financial characteristics to generate a machine-coded output.

Optionally, the user 402, provide the financial statements/report 408 to the computer arrangement 420 via the computing device 428, thereafter the data reading module 424 is configured to transmit the data to the cloud architecture 404. In the cloud architecture 404 the transmitted data is sent to the OCR model 410 for optical text recognition and thereafter the key factors 418 are sent to the database 412. The database 412 is configured to transmit the key factors 418 to the matching module 422 wherein the matching module 422 is configured to match the relevant data. Thereafter the generating module 426 is configured to patent the matched data to the relevant account and generate the machine-coded output.

Figure 5:
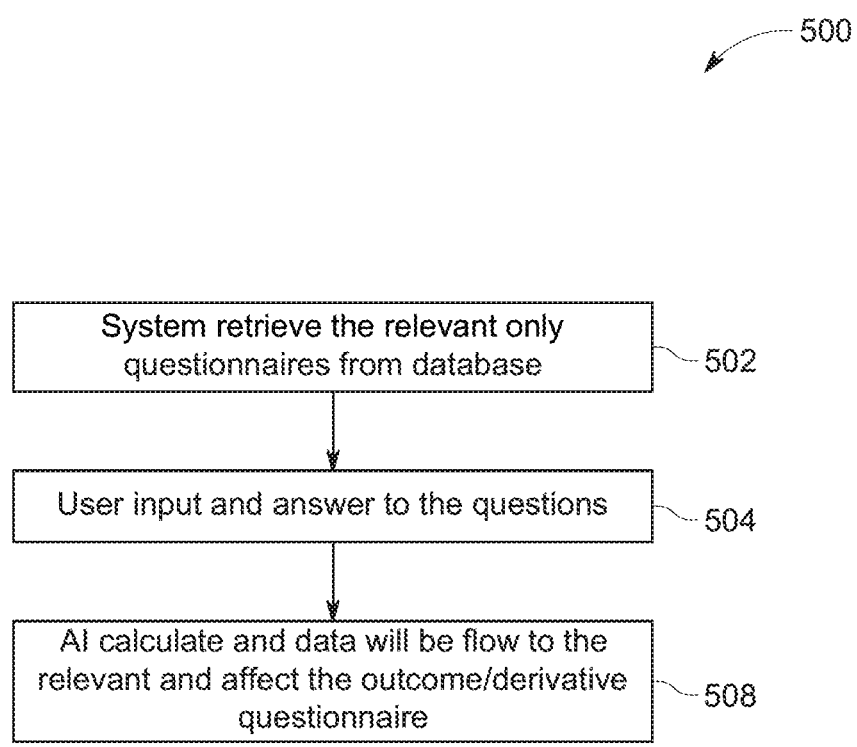
FIG. 5 is an illustration of an exemplary provision for providing questioners to the user, in accordance with a non-limiting embodiment of the present disclosure.

Referring to FIG. 5, there is shown exemplary provision 500 for providing questioners to the user, in accordance with a non-limiting embodiment of the present disclosure. The exemplary provision 500 provides an environment wherein horizontal cascade, for intelligently automating the audit planning process effectively and efficiently, eliminating the inconsistency, human fraud and personal judgement is performed. At 502, the system retrieves the relevant only questionnaires from database. In an example, the system is configured to communicate with the database to acquire the questioner and provide it to the user. At 504, the user provides input and answer to the questions. In other words, the user provides the response to the user (as described with FIG. 1). At 505, the artificial algorithm (as described in the aforementioned figure, namely FIG. 1) is configured to calculate, and thereafter the data is flown into the relevant and affect the outcome/derivative questionnaire. It is contemplated that one or more steps can be performed separately or together, at a same time or at different times, at a same location or at different locations, and/or in the illustrated order or out of order. Furthermore, it is contemplated that one or more steps can be optionally omitted.

Figure 6:
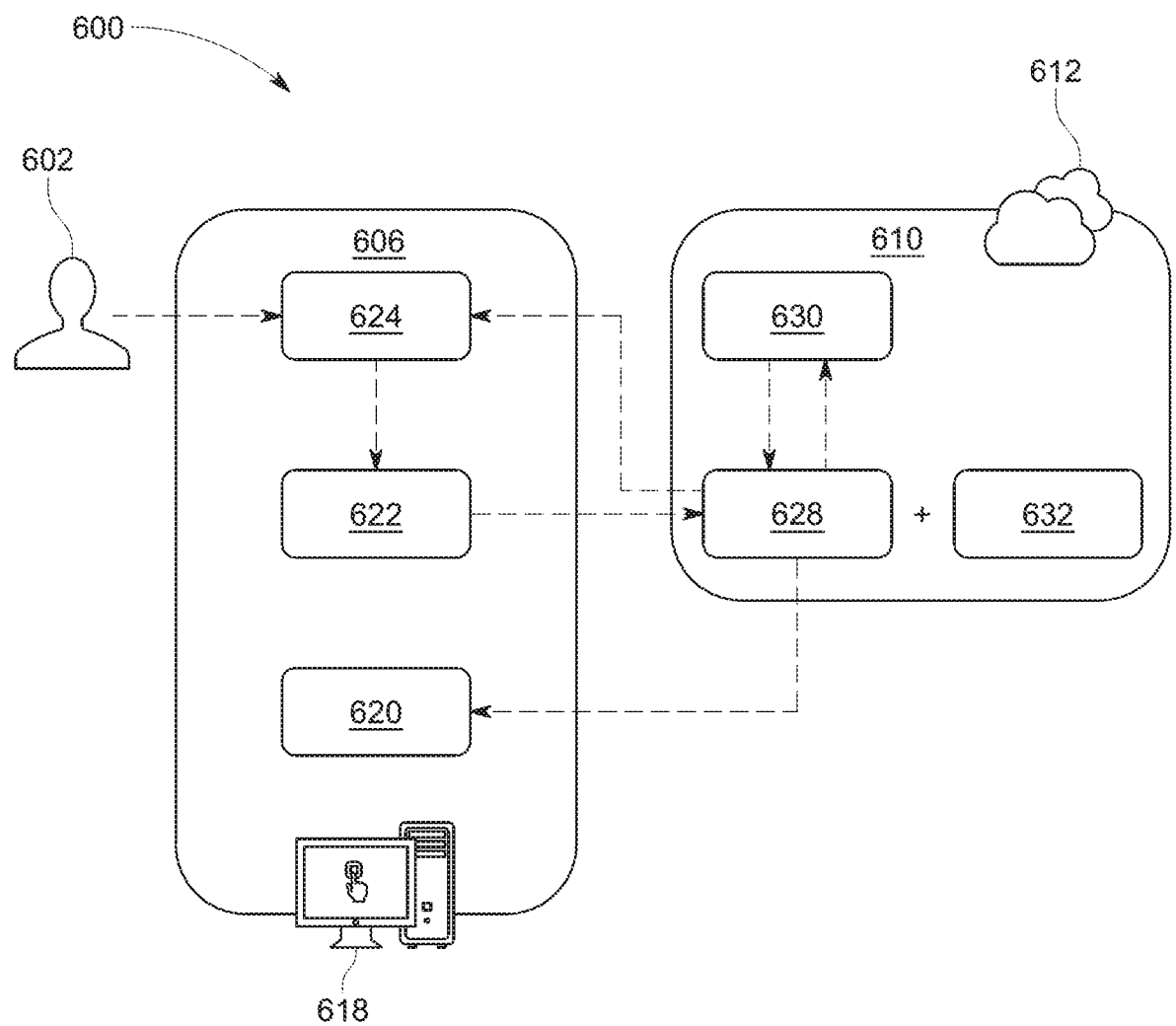
FIG. 6 is an illustration of a computing environment to implement the exemplary provision of FIG. 5, in accordance with a non-limiting embodiment of the present disclosure.

Referring to FIG. 6, there is shown a computing environment 600 to implement the exemplary provision 500 of FIG. 5, in accordance with a non-limiting embodiment of the present disclosure. As shown, the computing environment 600 depict a user 602, a computer arrangement 606, and a cloud architecture 612 includes a processing platform 610. The computer arrangement 606 includes a computing device 618, a first logical module 620, second logical module 622, and third logical module 624. The processing platform 610 includes a database 628, fourth logical module 630, and fifth logical module 632.

The user 602 is provided with the questionnaire, in other words cloud architecture 612 includes a processing platform 610 is configured to provide the questionnaire. Specifically, the database 628 is configured to provide the questionnaire to the user 602, and the first logical module 620 is configured to receive the questionnaire and provide it to the user 602, thereafter, the user response to the questionnaire is accumulated by the second logical module 622 and provide the accumulated user response to the questionnaire to the database 628. Thereafter, the database 628 is configured to provide the accumulated user response to the fourth logical module 630, wherein the fourth logical module 630 includes cascaded artificial algorithm that is configured to analyze the accumulated user response and determine if the accumulated user response is ambiguous. In such instance the database 628 is reconfigured to resend a new set of questionnaire in iterative manner. It will be appreciated that iteratively providing questioners is similar to process described in FIG. 1.

Figure 7:
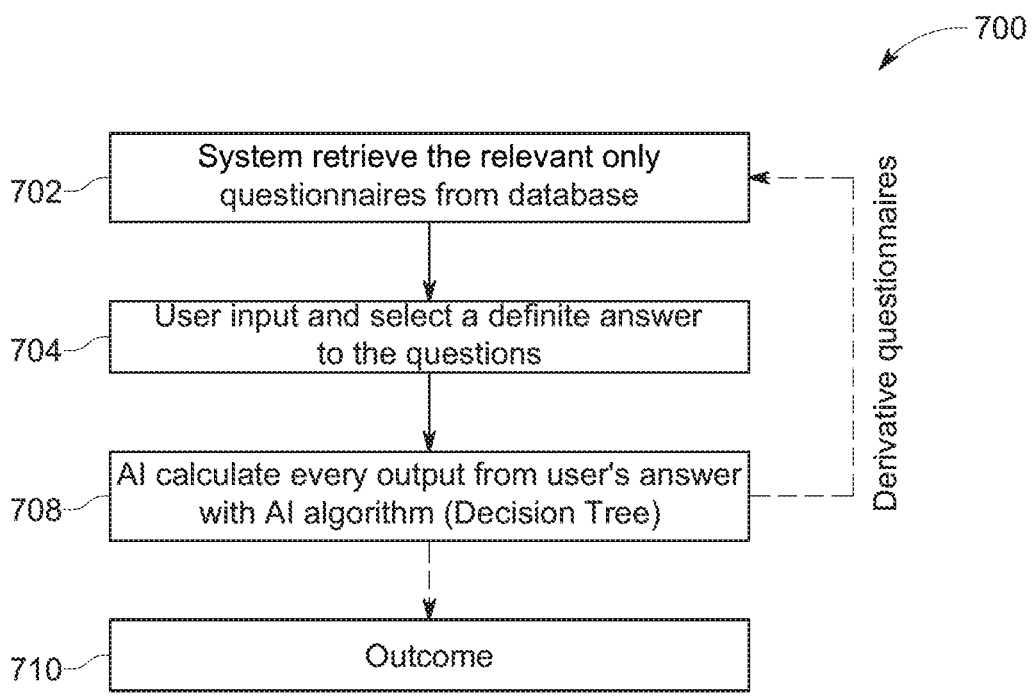
FIG. 7 is an illustration of another exemplary provision for providing questioners to the user, in accordance with a non-limiting embodiment of the present disclosure.

Referring to FIG. 7, there is shown another exemplary provision 700 for providing questioners to the user, in accordance with a non-limiting embodiment of the present disclosure. At 702, the system (such as the system 100 of FIG. 1) retrieves the relevant only questionnaires from database. In an example, the system is configured to fetch questions from the database. The system is configured to determine question based on factors, working condition of the entity, type of internal controls of the entity and the likes. At 704, the user input and selects a definite answer to the questions. In other words, the system enables acquiring definite answer to the questions in the form of user inputs. In an example, the system may provide menu-driven interface to acquire the definite answer to the questions by providing an input in the menu-driven interface. At 708, artificial intelligence algorithm is configured to calculate every output from user's answer with algorithm, namely decision tree algorithm. In other words, the artificial intelligence is configured to understand the context of the definite answer provided for the questions. The system is configured to implement the decision tree algorithm to analysis the context and determine a sentiment of the response (output). In other words, the decision tree algorithm is configured to filter out the ambiguous user response. In an instance if the user response is filtered as ambiguous then iteratively the questions are provided to the user to acquire definitive answers for the question. At 708, the output is provided. It is contemplated that one or more steps can be performed separately or together, at a same time or at different times, at a same location or at different locations, and/or in the illustrated order or out of order. Furthermore, it is contemplated that one or more steps can be optionally omitted.

Figure 8:
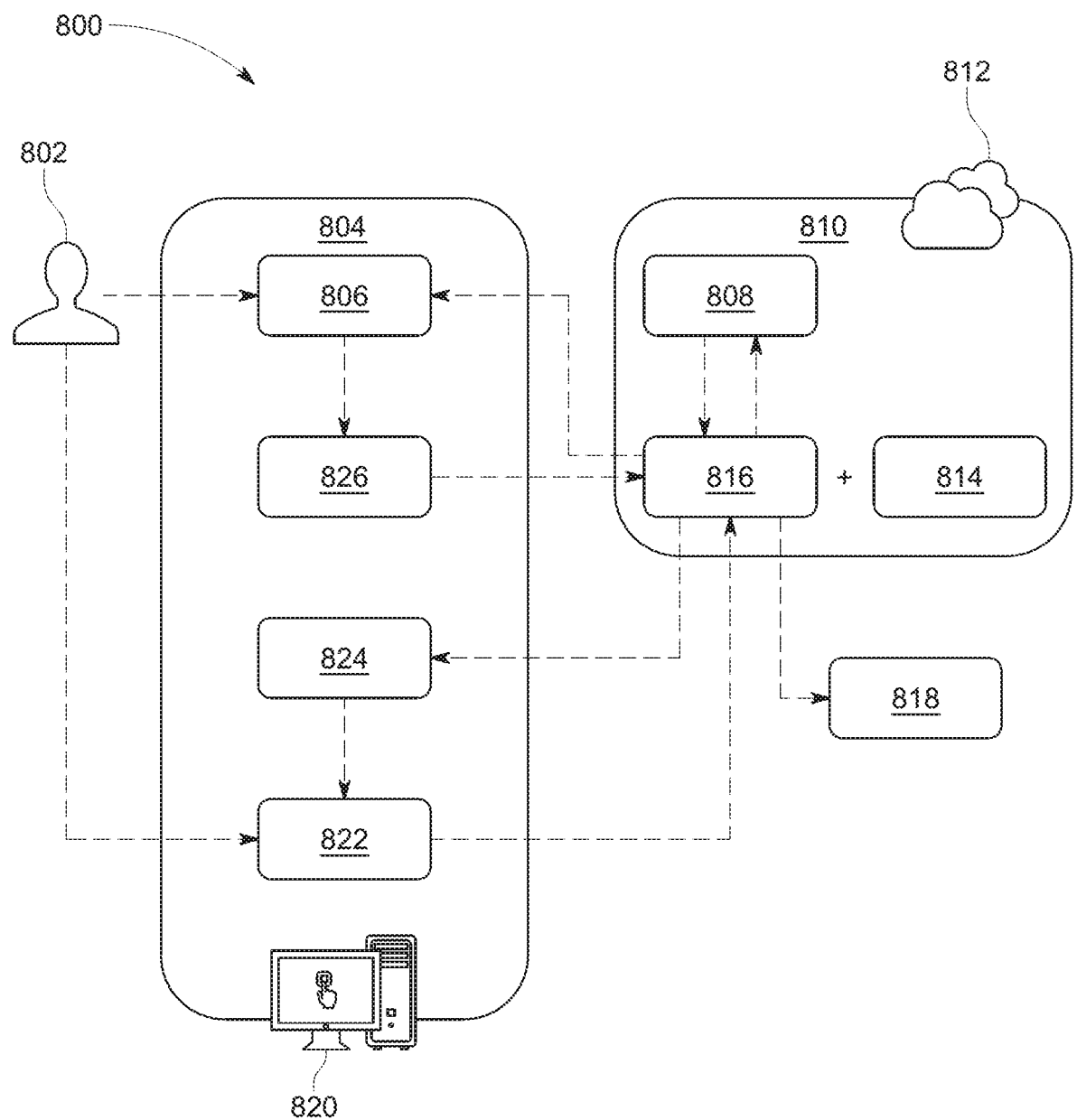
FIG. 8 is an illustration of a computing environment 800 to implement the exemplary provision of FIG. 7, in accordance with a non-limiting embodiment of the present disclosure.

Referring to FIG. 8, there is shown a computing environment 800 to implement the exemplary provision 700 of FIG. 7, in accordance with a non-limiting embodiment of the present disclosure. As shown, the computing environment 800 depict a user 802, a computer arrangement 804, and a cloud architecture 812 includes a processing platform 810. The computer arrangement 804 includes a computing device 820, a first logical module 806, second logical module 826, third logical module 824 and fourth logical module 822. The processing platform 610 includes a database 816, fifth logical module 808, and sixth logical module 814. The system is configured to provide the user 802 with the questionnaire, in other words cloud architecture 612 includes a processing platform 610 is configured to provide the questionnaire. Specifically, the database 816 is configured to provide the questionnaire to the user 802, and the first logical module 806 is configured to receive the questionnaire and provide it to the user 802, thereafter, the user response to the questionnaire is accumulated by the second logical module 826 and provide the accumulated user response to the questionnaire to the database 628. Thereafter, the database 628 is configured to provide the accumulated user response to the fifth logical module 808, wherein the fifth logical module 808 includes cascaded artificial algorithm that is configured to analyze the accumulated user response and determine if the accumulated user response is ambiguous. In such instance the database 628 is reconfigured to resend a new set of questionnaire in iterative manner. In such instance, the system is configured to resend the user 802 with the new questionnaire, in other words cloud architecture 612 including a processing platform 610 is configured to provide the new questionnaire. Specifically, the database 816 is configured to provide the new questionnaire to the user 802, and the third logical module 824 is configured to receive the questionnaire and provide it to the user 802, thereafter, the user response to the questionnaire is accumulated by the fourth logical module 822 and provide the accumulated user response to the questionnaire to the database 628. Thereafter, the database 628 is configured to provide the accumulated user response to the fifth logical module 808, wherein the fifth logical module 808 includes cascaded artificial algorithm that is configured to analyze the accumulated user response and determine if the accumulated user response is ambiguous. It will be appreciated that the above described process may be iteratively performed to receive definitive response from the user. Thereafter an output 818 including the definitive response from the user 802 provided.

Figure 9:
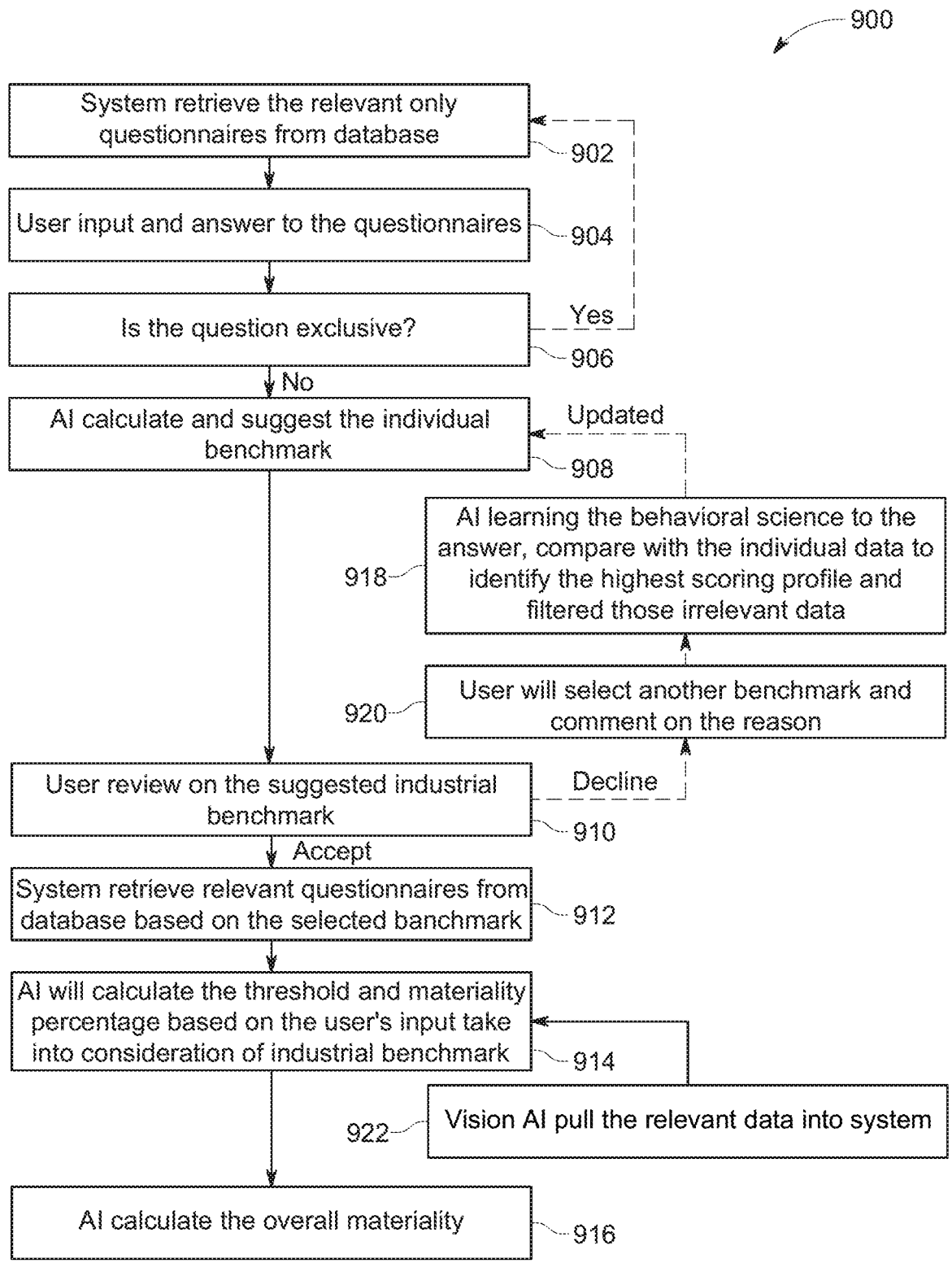
FIG. 9 is an illustration of an exemplary provision for calculating materiality easily, with only answering AI designed and/or suggested questionnaires, in accordance with a non-limiting embodiment of the present disclosure.

Referring to FIG. 9, there is shown an exemplary provision 900 for calculate materiality easily, with only answering AI designed and/or suggested questionnaires, in accordance with a non-limiting embodiment of the present disclosure. At 902, the system (such as the system 100 of FIG. 1) retrieves the relevant only questionnaires from database. At 904, the user input including the answer to the questionnaires is received. At 906, a check is implemented to determine if the question exclusive (definitive). At 908, the artificial intelligent algorithm calculates and suggests the individual benchmark. At 910, the user review on the suggested industrial benchmark. In the event, wherein the user rejects the suggested industrial benchmark, at 920, the user will select another benchmark and comment on the reason of selecting another benchmark. Furthermore, at 918, the artificial intelligent algorithm learns the behavioural science (context) for the answer and trains itself. Thereafter, the artificial intelligent algorithm compares the individual data to identify the highest scoring profile and filtered those irrelevant data. At 912, the system retrieves relevant questionnaires from database based on the selected benchmark. At 914, the AI will calculate the threshold and materiality percentage based on the user's input take into consideration of industrial benchmark. At 922, the Cognition AI retrieves the relevant data into system. At 916, the artificial intelligent algorithm calculates the overall materiality. It is contemplated that one or more steps can be performed separately or together, at a same time or at different times, at a same location or at different locations, and/or in the illustrated order or out of order. Furthermore, it is contemplated that one or more steps can be optionally omitted.

Figure 10:
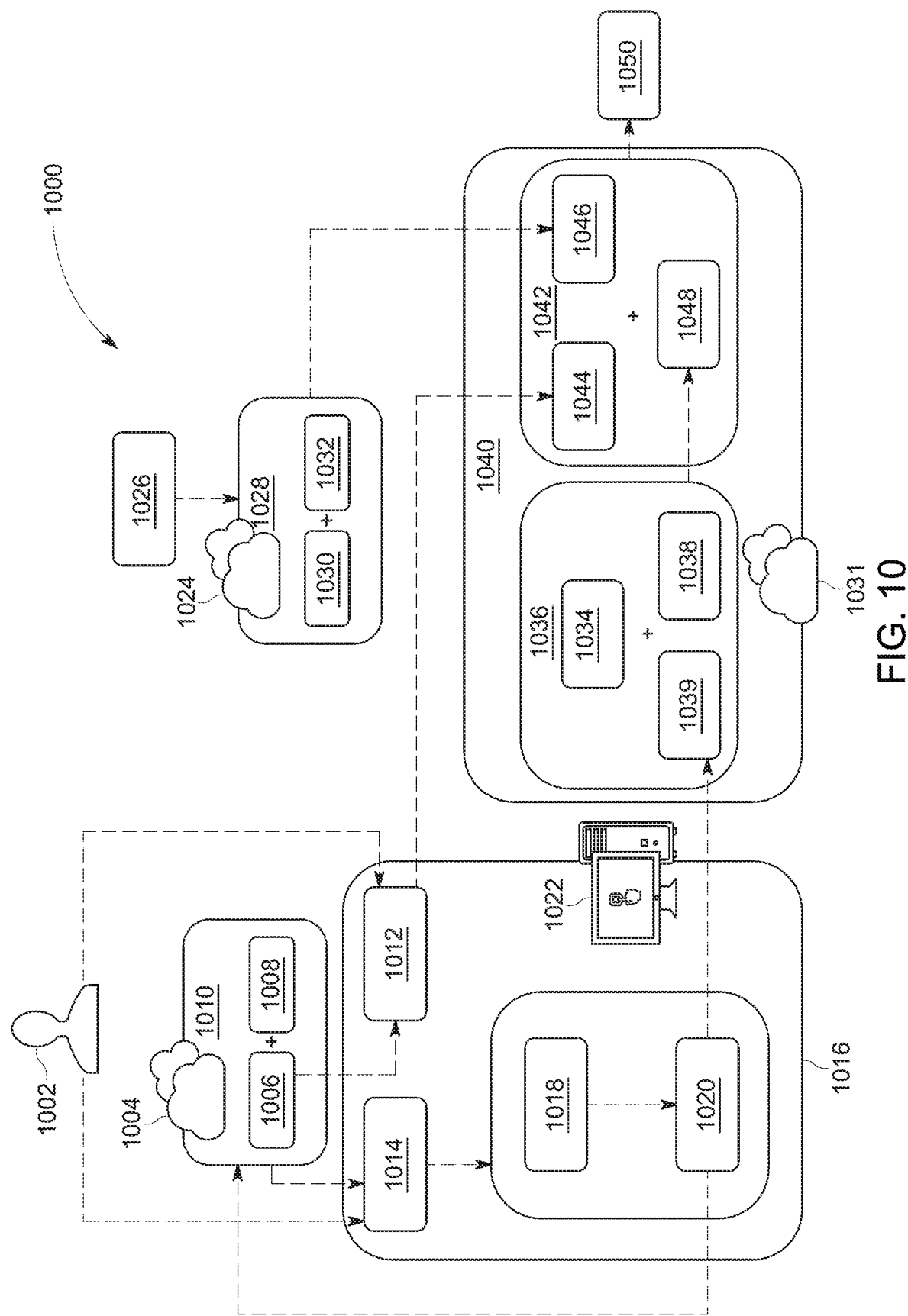
FIG. 10 is an illustration of a computing environment to implement the exemplary provision of FIG. 9, in accordance with a non-limiting embodiment of the present disclosure.

Referring to FIG. 10, there is shown a computing environment 1000 to implement the exemplary provision 900 of FIG. 9, in accordance with a non-limiting embodiment of the present disclosure. As shown the computing environment 1000 includes a user 1002, cloud structure 1004, a cloud computing structure 1010 including a database 1006 and logical module 1008, a computer arrangement 1016 includes a computing device 1022, including the logical modules 1014 and 1012 for iteratively retrieving user response for the question, further the iteratively retrieving user response for the question is managed by the modules 1018 and 1020. The computing environment 1000 includes a cloud structure 1031 to calculate mentality the module employs artificial algorithm. Furthermore, the cloud structure 1031 includes a logical module 1040 to calculate mentality, wherein the logical module 1040 includes plurality of units 1036, and 1042. The unit 1036 include logical units 1034, 1038 and 1039 for implementing the artificial intelligent algorithm, the industrial data and the data from the module 1020 that manages the user response for the question, specifically the ambiguous responses. The unit 1042 calculates threshold and materiality percentage using the logical units 1044, 1046 and 1048. The logical unit 1044 collects data relates to the logical module 1012, the logical unit 1048 collects the benchmark data from the logical unit 1038 and the logical unit 1046 is configured to collect the account data. The account data is provided by the cloud structure 1024. The cloud structure 1024 includes a computing environment 1028 having a database 1030 and a module 1032 to implement OCR, furthermore, the cloud structure 1024 receives that data from uploaded financial statement 1026.

Optionally the computing environment 1000 is a system that is configured to use the cognition AI and AI calculation module. The system is communicatively coupled with the AI, the cognition AI and the AI calculation module via a communication network. The system only retrieves the relevant questionnaires from the database and accordingly, the user feeds input to the questionnaires. In case the question retrieved is exclusive, the system again attempts to retrieve the relevant questionnaires from the database on the basis of the feedback provided. Optionally, if the question retrieved is not exclusive, the AI calculates and suggests an industrial benchmark. Thereafter, the user shall review the suggested industrial benchmark. Furthermore, in the event wherein the user declines the suggested industrial benchmark, accordingly, the user shall select another benchmark and shall provide the reason. On the basis of the aforesaid, AI learns the behavioural science to the answer, compare with the industrial data to identify the highest-scoring profile and filter the irrelevant data. Simultaneously, it provides an update for calculation and suggestion of the industrial benchmark. Optionally, if the user accepts the suggested industrial benchmark, the system shall retrieve the relevant questionnaires from the database based on the selected benchmark and accordingly, the user feeds input to the questionnaires. Thereafter, the AI shall calculate threshold and materiality percentage based on the user's input taken into consideration of industrial benchmark. Simultaneously, the cognition AI pulls the relevant data into the system. Accordingly, the AI calculates the overall materiality. It is pertinent to mention that the present environment may be implemented in a computerized environment such as the system shown in FIG. 1.

Figure 11:
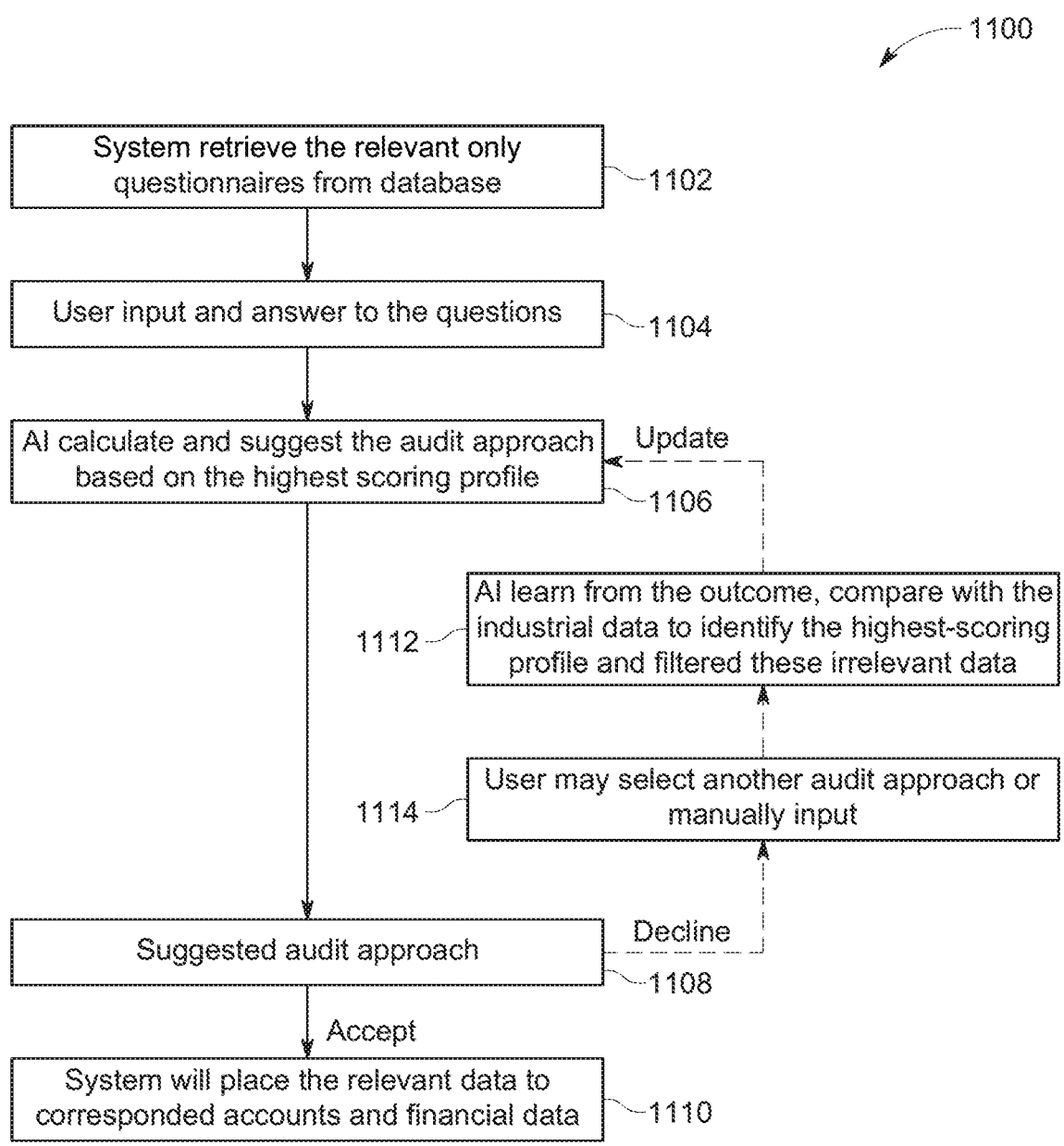
FIG. 11 is an illustration of an exemplary provision for suggesting audit approach, in accordance with a non-limiting embodiment of the present disclosure.

Referring to FIG. 11, there is shown an exemplary provision 1100 for suggesting audit approach, in accordance with a non-limiting embodiment of the present disclosure. At 1102, the system (such as the system 100 of FIG. 1) retrieves the relevant only questionnaires from database. At 1104, answers to the questions are provided as the user input. At 1106, the artificial intelligent algorithm calculates and suggests the audit approach based on the highest scoring profile. At 1108, the system suggests an audit approach. Optionally, if the suggested audit approach is deemed unacceptable by the user, in such invent, at 1114, the user may select another audit approach or manually input data, and thereafter at 1112, the artificial intelligent algorithm learns from the outcome, compare with the industrial data to identify the highest-scoring profile and filtered these irrelevant data. Thereafter, at 1110 the system will place the relevant data to corresponded accounts and financial data. It is contemplated that one or more steps can be performed separately or together, at a same time or at different times, at a same location or at different locations, and/or in the illustrated order or out of order. Furthermore, it is contemplated that one or more steps can be optionally omitted.

Figure 12:
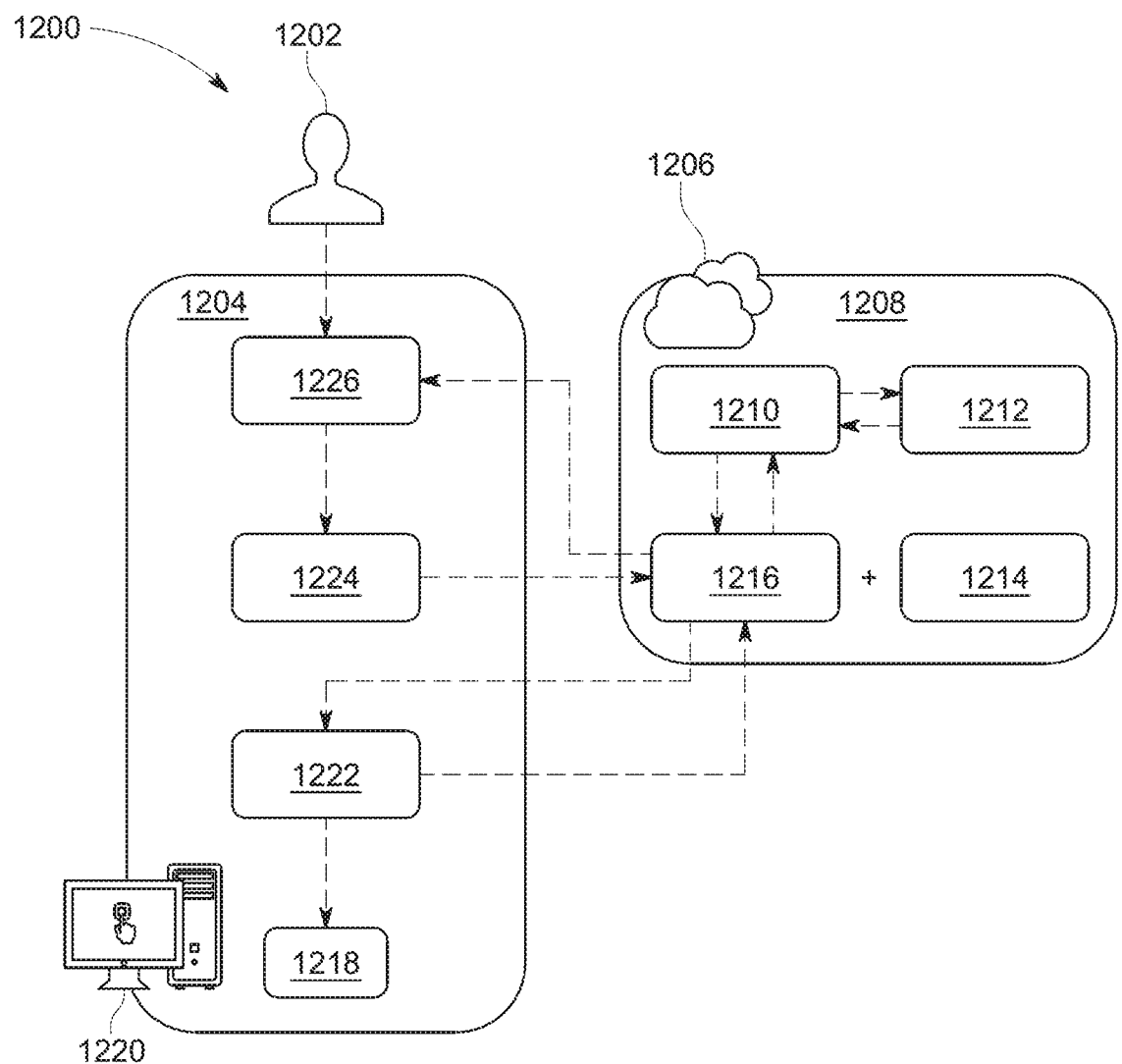
FIG. 12 is an illustration of a computing environment to implement the exemplary provision of FIG. 11, in accordance with a non-limiting embodiment of the present disclosure.

Referring to FIG. 12, there is shown a computing environment 1200 to implement the exemplary provision 1100 of FIG. 11, in accordance with a non-limiting embodiment of the present disclosure. As shown the computing environment 1200 includes a user 1202 communicating with a computer arrangement 1220, includes a computing device 1204 for implementing the logical modules 1218, 1222, 1224, and 1226 that communicates with logical modules 1210, 1212, 1214, and a database 1216 included in data processing platform 1208 of a cloud architecture 1208. The user 1202 is provided with the questionnaire, in other words the processing platform 1208 of the cloud architecture 1208 is configured to provide the questionnaire. Specifically, the database 1216 is configured to provide the questionnaire to the user 1202, and the logical modules 1224, and 1226 are configured to manage the response of the user such as receive the questionnaire and provide it to the user 1202, thereafter, the user response to the questionnaire is accumulated and provide the accumulated user response to the questionnaire to the database 1216. The database 1216 is configured to uses the logical modules 1210, 1212, 1214 to analysis the user response, generate a profile and score the profile and thereafter compare the sore with the industrial data include in the logical module 1212 and thereafter provide a suggest an audit approach 1222 that may be accepted by the user 1202 at 1218

Figure 13:
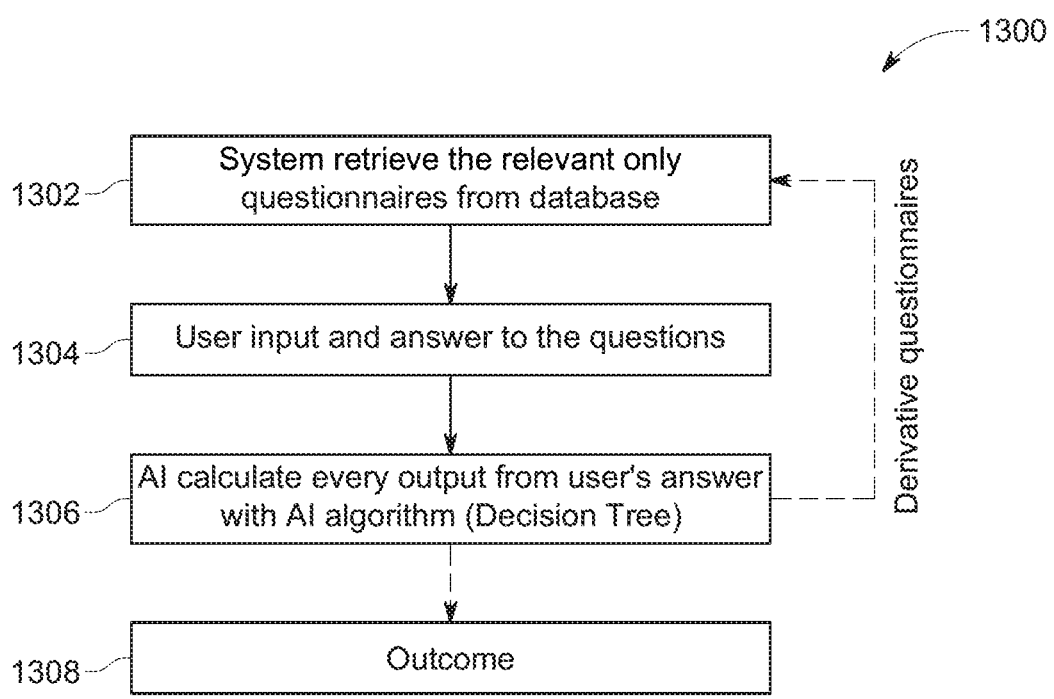
FIG. 13 is an illustration of an exemplary provision for iteratively providing questioners approach, in accordance with a non-limiting embodiment of the present disclosure.

Referring to FIG. 13, there is shown an exemplary provision 1300 for iteratively providing questioners approach, in accordance with a non-limiting embodiment of the present disclosure. At 1302, system (such as the system 100 of FIG. 1) retrieves the relevant only questionnaires from database. The relevant only questionnaire refers to the questions that are configured to acquire definitive and informative answers/response from the user. At 1304, answers to the questions are provided as user inputs. At 1306, the artificial intelligent algorithm calculates every output from user's answer with artificial intelligent algorithm namely, decision tree as explained in FIG. 1. In other words, the system is configured to implement the decision tree algorithm to analysis the context and determine a sentiment of the response (output). In other words, the decision tree algorithm is configured to filter out the ambiguous user response. In an instance if the user response is filtered as ambiguous then iteratively the questions are provided to the user to acquire definitive answers for the question. At 1308, the output is determined and stored therein. It is contemplated that one or more steps can be performed separately or together, at a same time or at different times, at a same location or at different locations, and/or in the illustrated order or out of order. Furthermore, it is contemplated that one or more steps can be optionally omitted.

Figure 14:
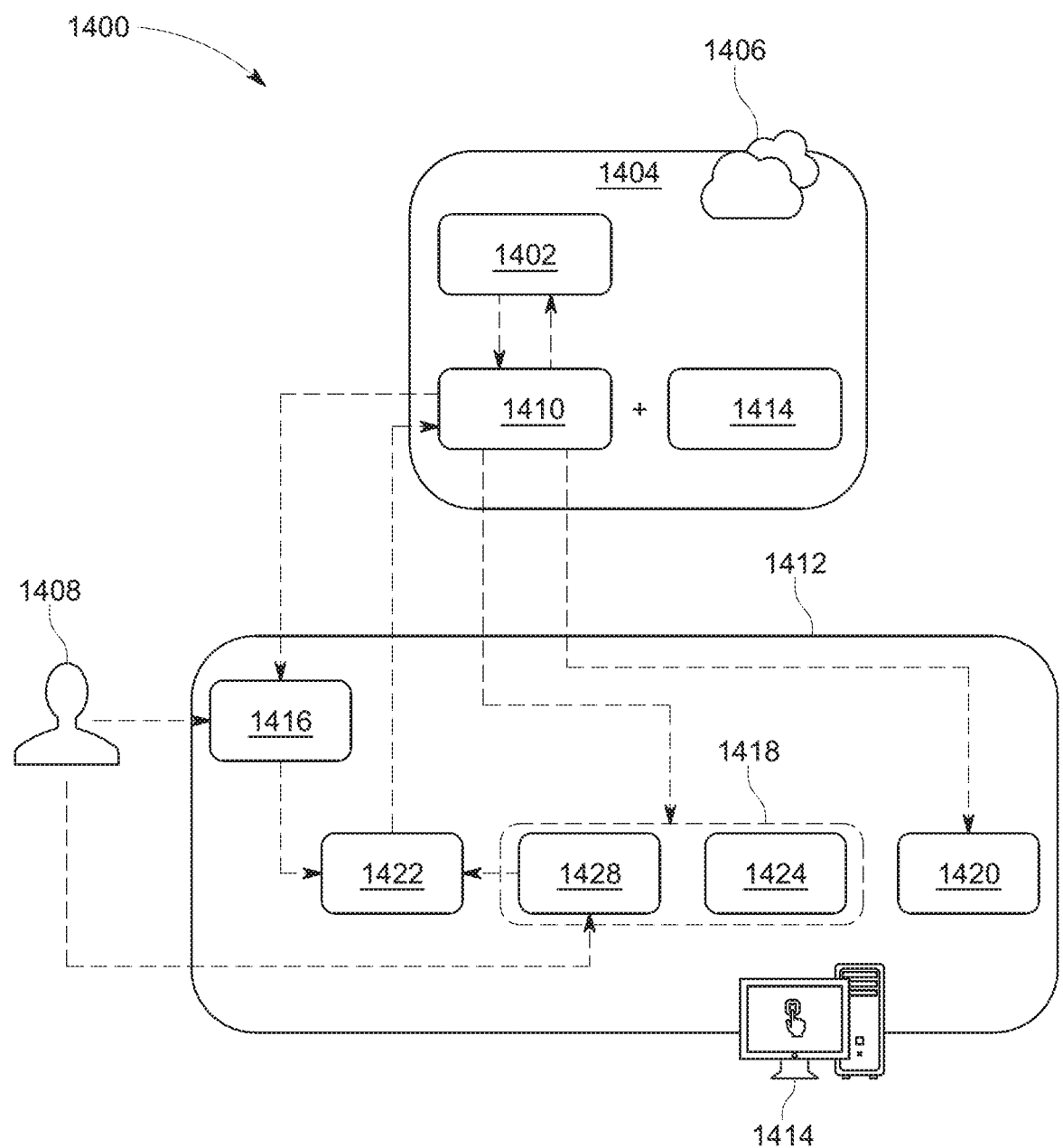
FIG. 14 is an illustration of a computing environment to implement the exemplary provision of FIG. 13, in accordance with a non-limiting embodiment of the present disclosure.

Referring to FIG. 14, there is shown a computing environment 1400 to implement the exemplary provision 1300 of FIG. 13, in accordance with a non-limiting embodiment of the present disclosure. As shown the computing environment 1400 includes a user 1408, cloud architecture 1406 includes a processing platform 1404 that comprises of a database 1410, and logical module implementing artificial algorithm 1402, and another logical module 1412, and a computer arrangement 1414 including logical module 1416, 1418, 1420, 1422, and 1424. The user 1408 is responds to the question provided by the database 1410 and the responses are accumulated in logical module 1422 and provided to the database 1410 and analyzed by the logical module implementing artificial algorithm 1402, and another logical module 1412. In the event, wherein the responses are distinct the output is stored in logical module 1420, and if the responses are ambiguous then the new set of question is send to the logical module 1424 and thereafter passed on to the user for definite answers/responses and upon receiving a definitive answer the answers/responses are stored in database 1410 and analyzed by the logical module implementing artificial algorithm 1402, and another logical module 1412 and subsequently stored in logical module 1420 as outputs.

Figure 15:
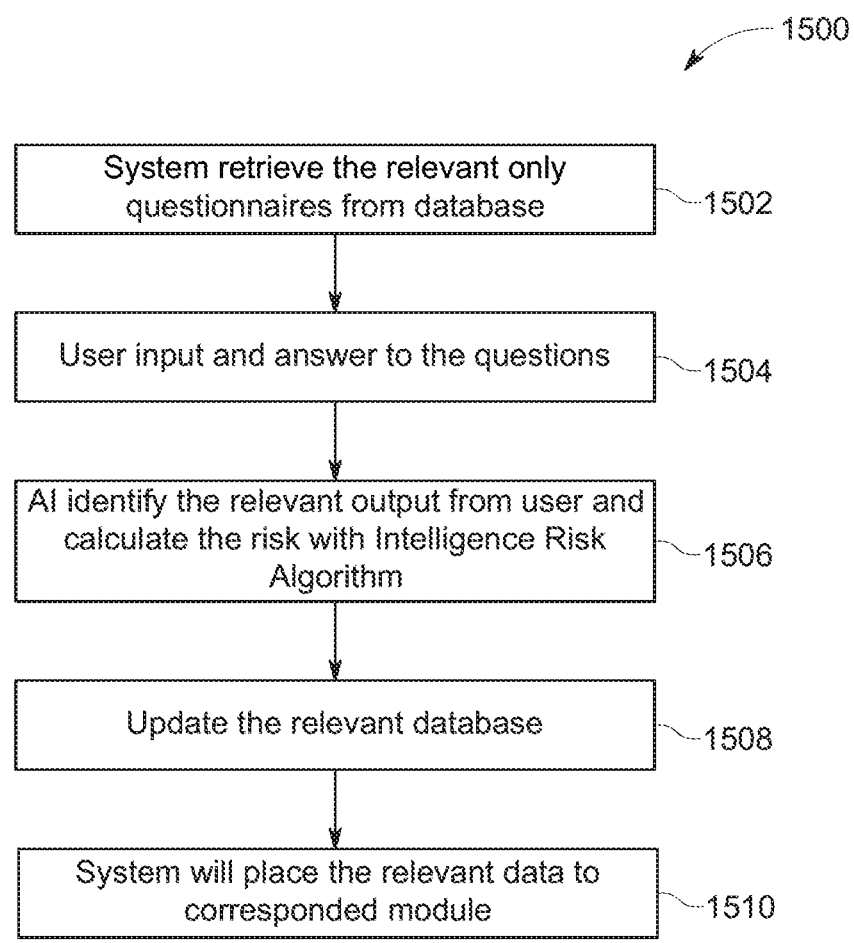
FIG. 15 is an illustration of an exemplary provision for intelligent risk calculation, in accordance with a non-limiting embodiment of the present disclosure.

Referring to FIG. 15, there is shown an exemplary provision 1500 for intelligent risk calculation, in accordance with a non-limiting embodiment of the present disclosure.

At 1502, system (such as the system 100 of FIG. 1) retrieves the relevant only questionnaires from database. The relevant only questionnaire refers to the questions that are configured to acquire definitive and informative answers/response from the user. At 1504, answers to the questions are provided as user inputs. At 1506, the artificial intelligent algorithm identifies the relevant output from user, and calculates the risk with intelligence risk algorithm from the entity from the relevant output from user. At 1508, the system is configured to update the relevant database and at 1510, the system will place the relevant data to corresponded module wherein that may be used to present it to the user as a report. It is contemplated that one or more steps can be performed separately or together, at a same time or at different times, at a same location or at different locations, and/or in the illustrated order or out of order. Furthermore, it is contemplated that one or more steps can be optionally omitted.

Figure 16:
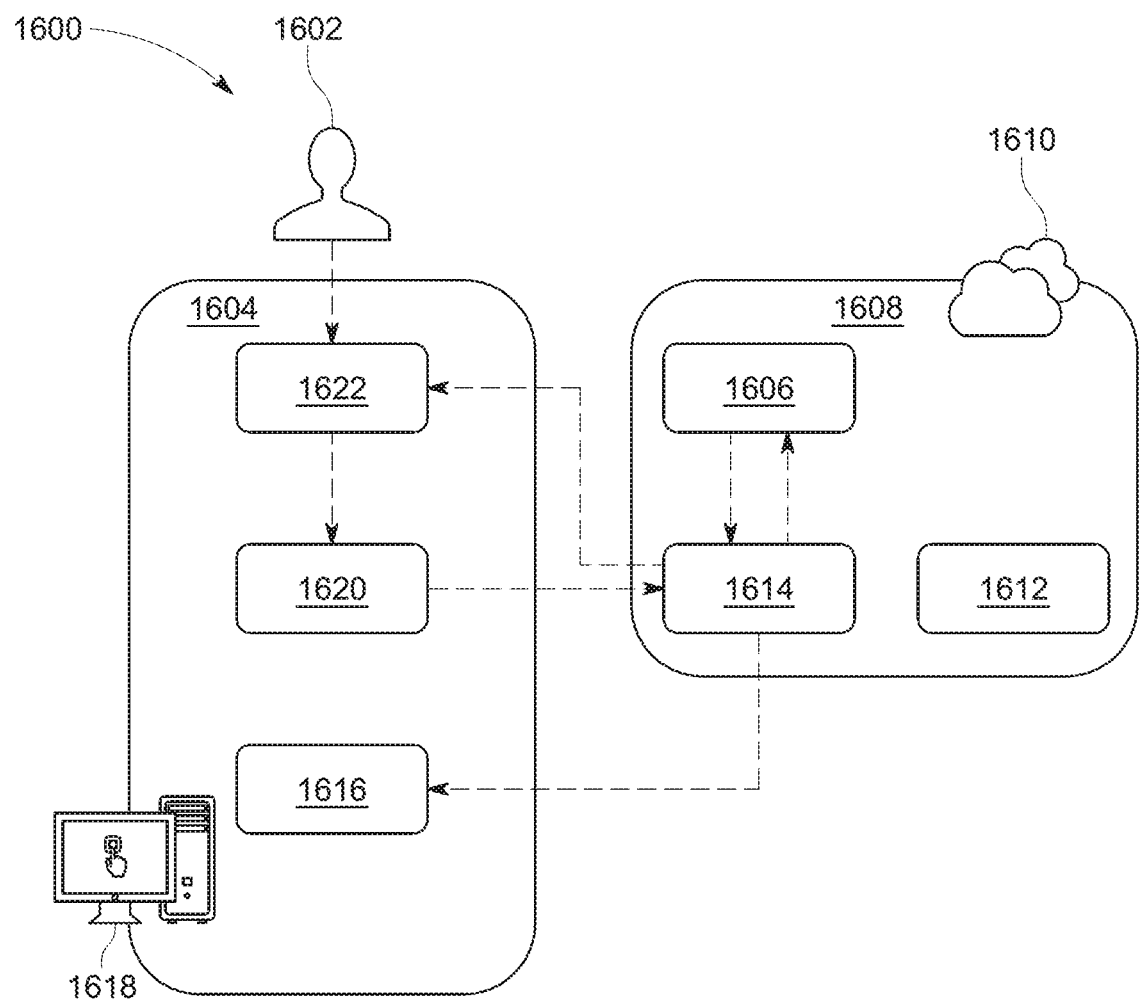
FIG. 16 is an illustration of a computing environment to implement the exemplary provision of FIG. 15, in accordance with a non-limiting embodiment of the present disclosure.

Referring to FIG. 16, there is shown a computing environment 1600 to implement the exemplary provision 1500 of FIG. 15, in accordance with a non-limiting embodiment of the present disclosure. As shown, the computing environment 1600 depict a user 1602, a computer arrangement 1604 including computing device 1618, and a cloud architecture 1610 includes a processing platform 1608. The computing device 1618 includes logical modules 1616, 1620, and 1622 and the processing platform 1608 includes a database 1614, and logical module implementing artificial algorithm 1606, and another logical module 1612. The user 1602 is responds to the question provided by the database 1614 and the responses are accumulated in logical module 1622 and provided to the database 1614 by the logical module 1620 and analyzed by the logical module implementing artificial algorithm 1606, and another logical module 1612 to determine the risk as a outcome and the identified risk is stored in the 1616 to be provided to the user 1602.

Figure 17:
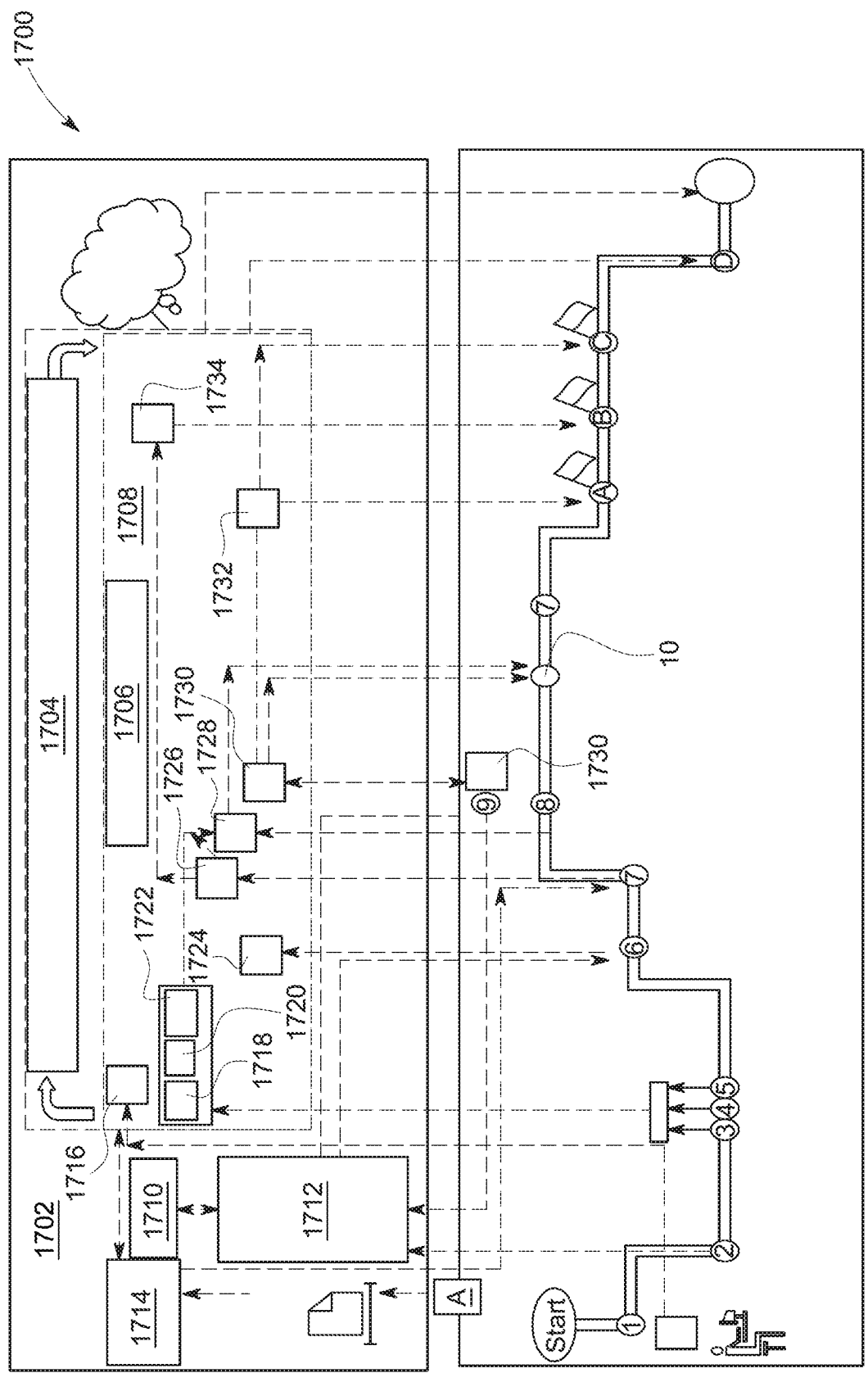
FIG. 17 is an illustration of an overview of the system of FIG. 1, in accordance with a non-limiting embodiment of the present disclosure.

Referring to FIG. 17, there is shown an overview 1700 of the system 100 of FIG. 1, in accordance with a non-limiting embodiment of the present disclosure. The 1700 includes a data processing platform 1702 including logical modules 1704 implemented as an application tier-Intelligent risk algorithm module (IRA), 1710 as OMM App, 1712 as Overall Materiality Module Database, 1714 as Cognition AI, 1716 as audit strategy (AS), 1718 as business environment (BE), 1720 as internal control (IC), 1722 as management meeting (MM), 1724 as preliminary analytical review (AR), 1726 as risk consideration (RC), 1728 as assertion risk assessment (AS), 1730 as financial statement assessment (FS), 1732 as performance materiality (PM), 1734 as audit program (AP), and a database 1706. Further, the overview 1700 of the system 100 of FIG. 1 includes a sequence showing the plurality of events numbered as 1 as start (ST), 2 as overall materiality (OM), 3 as business environment (BE), 4 as internal control (IC), 5 as management meeting (MM), 6 as preliminary analytical review (AR), 7 as risk consideration (RC), 8 as audit strategy (AS), 9 as financial statement assessment (FS), 10 as risk response summary (RR), 12 as risk response implementation (RRI).

It will be appreciated logical modules 1704 implemented as an application tier-Intelligent risk algorithm module (IRA), 1710 as OMM App, 1712 as Overall Materiality Module Database, 1714 as Cognition AI, 1716 as audit strategy (AS), 1718 as business environment (BE), 1720 as internal control (IC), 1722 as management meeting (MM), 1724 as preliminary analytical review (AR), 1726 as risk consideration (RC), 1728 as assertion risk assessment (AS), 1730 as financial statement assessment (FS), 1732 as performance materiality (PM), 1734 as audit program (AP) requests multiple inputs from the user and at the events in the sequence, namely the 1 as start (ST), 2 as overall materiality (OM), 3 as business environment (BE), 4 as internal control (IC), 5 as management meeting (MM), 6 as preliminary analytical review (AR), 7 as risk consideration (RC), 8 as audit strategy (AS), 9 as financial statement assessment (FS), 10 as risk response summary (RR), the user provides its inputs. Subsequently, a data processing platform 1702 depicted as server arrangement in the system (such as the system 100 of FIG. 1) at the event A provides report describe the performance materiality (PM) of the entity, at the event B provides report describe the audit program (AP) for the entity, at the event C provides report describe the sample size (SS) for the entity, and at the event 11 provides report describe the audit planning memo (APM) for the entity and at 12 provides report describing the risk response implementation (RRI).

Figure 18:
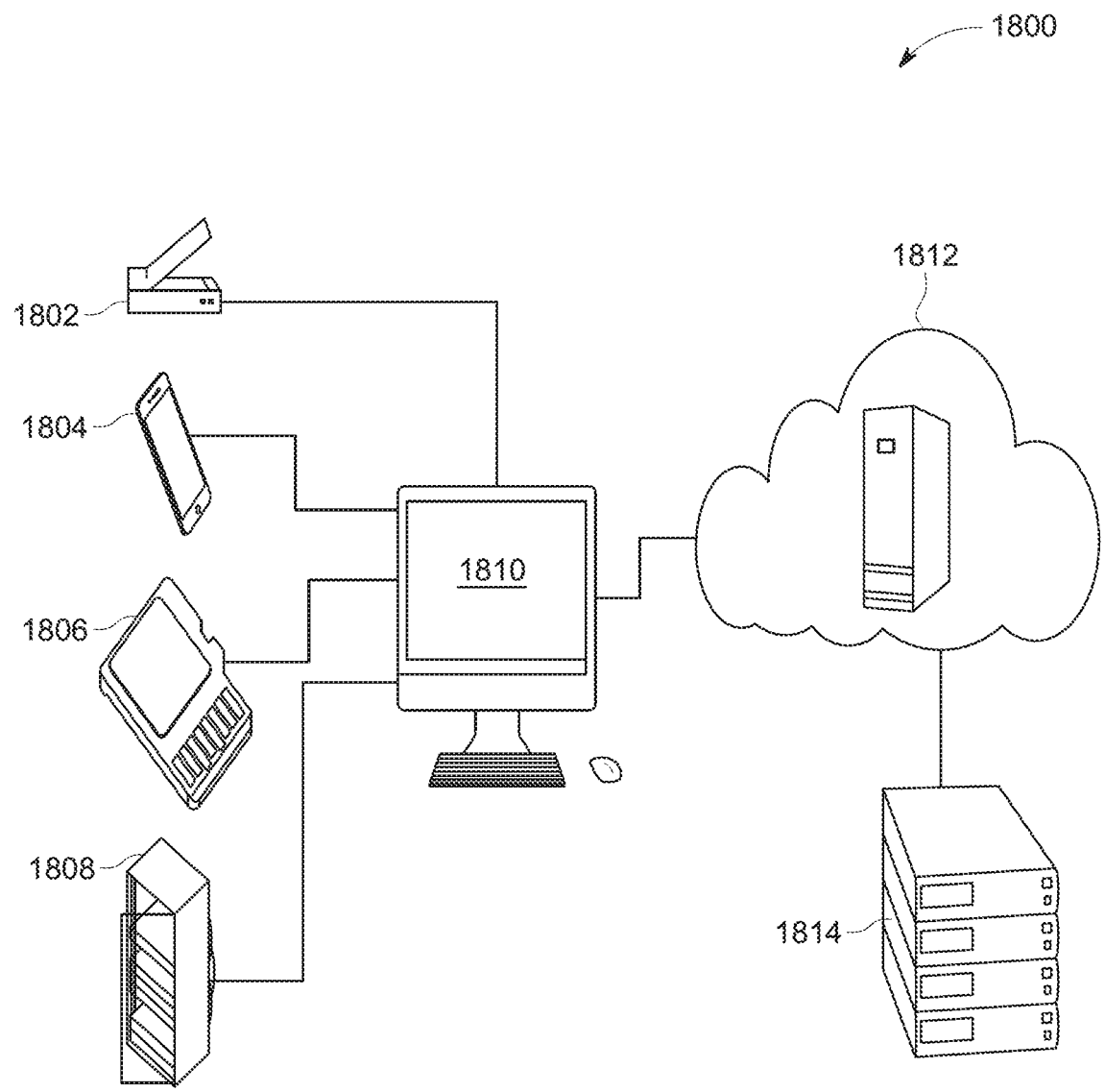
FIG. 18 is an illustration of an exemplary environment for implementing the system of FIG. 1, in accordance with a non-limiting embodiment of the present disclosure.

Referring to FIG. 18, there is shown an exemplary environment 1800 for implementing the system 100 of FIG. 1, in accordance with a non-limiting embodiment of the present disclosure. As shown the exemplary environment 1800 comprises a computing device 1810 communicably coupled to plurality of input-and/or output devices 1802, 1804, 1806, and 1808, a server arrangement 1812, and third-party 1814. Optionally, the computing device 1810 may be a personal computer, the input-and/or output devices 1802 may be scanner that can be used to scan an provide document to the system, input-and/or output devices 1804 may be a smartphone that can capture images and user inputs and provide it to the system, input-and/or output devices 1806 may be a security digital card that can store data from an external source and provide it to the system, or input-and/or output devices 1808 can be internal/external server of the entity that store and provide the financial data. Optionally, the third-party 1814 may be affiliated with a particular area of interest for global financial trends. The third-party may be selected from a plurality of potential third-parties, for example, dedicated financial program reviewing organizations, financial educational organizations, or special interest organizations.

Figure 19:
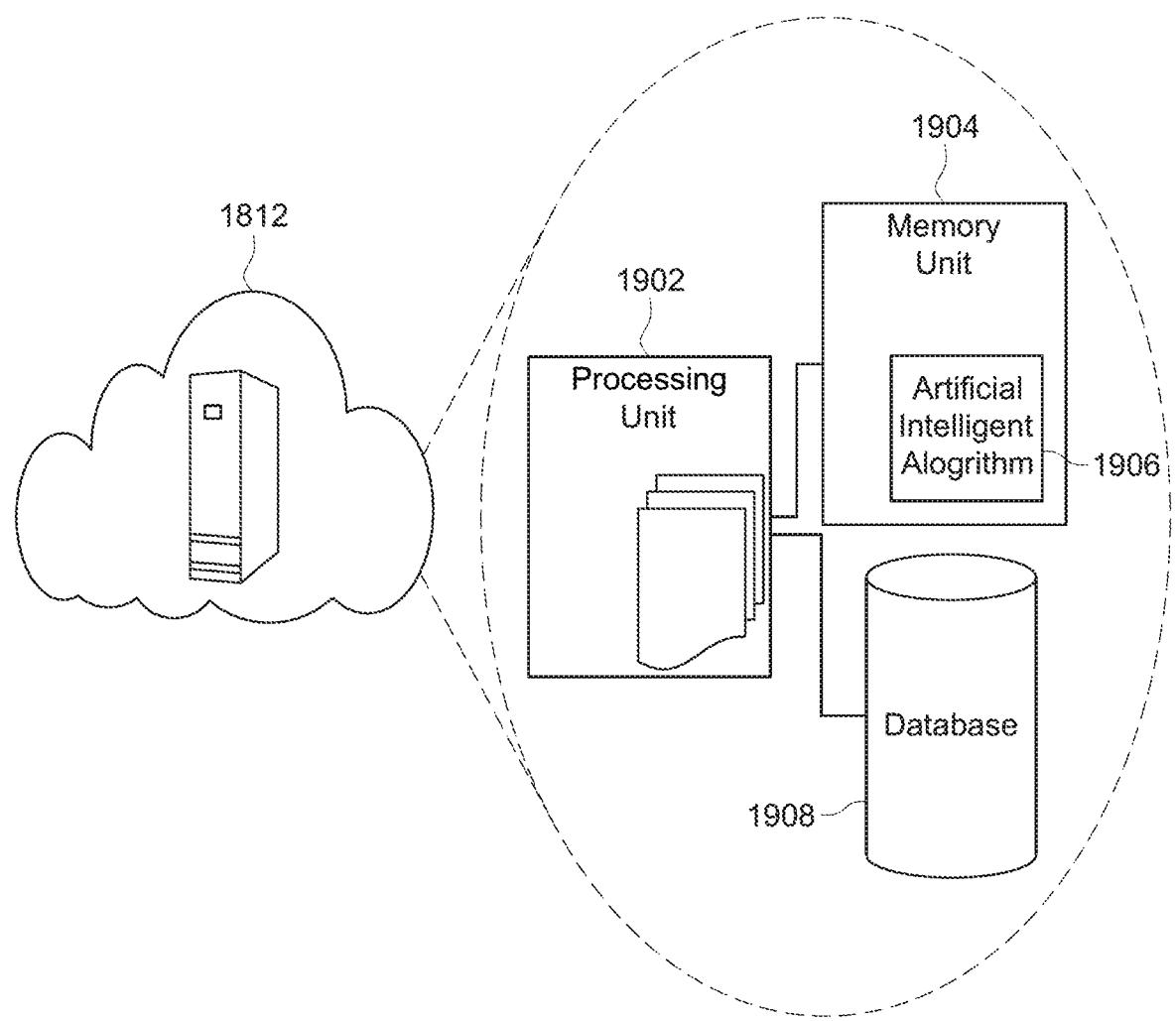
FIG. 19 is an illustration of an exploded view of the server arrangement of FIG. 18, in accordance with a non-limiting embodiment of the present disclosure.

Referring to FIG. 19, there is shown an exploded view of the server arrangement 1812 of FIG. 18, in accordance with a non-limiting embodiment of the present disclosure. As shown the server arrangement 1812 is implemented as cloud architecture. The server arrangement 1812 is at least one processing unit 1902, at least one memory unit 1904 including multiple instruction and artificial intelligent algorithm 1906, and a database 1908.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain non-limiting embodiments may be disclosed in a range format. The description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A computer implemented system for generating assurance related planning process and documents for an entity, the system comprising:
    a computer arrangement comprising a computing device communicably coupled to plurality of input-and/or output devices to acquire inputs and source data of the entity from a user; and
    a server arrangement communicably coupled to the computer arrangement, wherein the server arrangement comprises at least one processing unit, and at least one memory unit configured to store a plurality of processing instruction that, when executed by the at least one processing unit, causes the at least one processing unit to:
        analyze the source data by a first logical module to identify data with financial characteristics in the form of quantitative and/or qualitative content to generate a machine-coded output for the entity including the identified data with financial characteristics;
        acquire a response from the user by a second logical module for sequentially provided a plurality of questionnaire sets, wherein each questionnaire set comprises a plurality of queries associated with operation of the entity, and wherein the plurality of queries in a given questionnaire set is generated based on responses provided by the user to the plurality of queries included in a questionnaire set that precedes the given questionnaire set;
        train an artificial neural network using a first training dataset, by a fifth logical module, wherein the first training dataset includes the acquired response from the user;
        analyze the machine-coded output by the fifth logical module using the trained artificial neural network and external financial data, wherein the external financial data is obtained or received from a third-party;
        generate a first user interface to display first machine-coded questionnaires for the entity, wherein the questionnaires comprise a plurality of risk assessment parameters;
        create a second training dataset comprising at least one input from the user for at least one risk assessment parameter of the plurality of risk assessment parameters;
        train the artificial neural network by the fifth logical module using the second training dataset; and
        generate a second user interface to display second machine-coded questionnaires for the entity using the artificial neural network trained by the second training dataset.

2. The system according to claim 1, wherein the system is configured to use an automated machine learning module to identify data with financial characteristics to generate a machine-coded output for the entity.

3. The system according to claim 1, wherein the source data are configured to be analyzed using at least one analytical artificial intelligence algorithm.

4. The system according to claim 3, wherein the at least one analytical artificial intelligence algorithm comprises at least one supervised learning algorithm.

5. The system according to claim 1, wherein the plurality of questionnaire sets is related to at least one of the following:
    defining an audit strategy of the entity;
    determining a business environment of the entity;
    determining internal controls of the entity;
    defining a risk consideration of the entity;
    determining an overall performance materiality of the entity;
    meeting with management of the entity;
    generating an audit program or auditing procedure for of the entity, or any combination thereof.

6. The system according to claim 1, wherein the plurality of processing instructions comprises deep learning algorithms to sequentially provide plurality of questionnaire sets.

7. The system according to claim 1, wherein the server arrangement further comprises a database to ontologically store the response from the user for the sequentially provided plurality of questionnaire sets.

8. The system according to claim 1, wherein the system further comprises an artificial neural network processing module for training and validating the operation of the artificial neural network, the artificial neural network processing module comprising:
    an artificial neural network training module for processing the acquired response from the user based on a predefined set of parameters, and determine a set of operating coefficients to be used by the artificial neural network when determining validity of the acquired response to the plurality of queries; and
    a response data history data store for maintaining all of the response provided by the user corresponding to the plurality of queries.

9. The system according to claim 8, wherein the artificial neural network training module is configured to train and validate the operation of the artificial neural network used on the operating coefficients generated and the response from the user in real-time.

10. The system according to claim 1, wherein the server arrangement is implemented as a cloud architecture.

11. The system according to claim 1, wherein risk summary of the risk assessment parameters for the entity is ontologically stored in the database.

12. The system according to claim 1, wherein the at least one processing unit is configured to use the trained artificial neural network to analyze the response acquired from the user for the sequentially provided plurality of questionnaire sets for determining the overall materiality level of the entity.

13. The system according to claim 1, wherein the trained artificial neural network is configured to determine a threshold value and a materiality level for analyzing the response acquired from the user for sequentially provided plurality of questionnaire sets and the identify data with financial characteristics included in the machine-coded output generated by the automated machine learning module.

14. The system according to claim 1, wherein the plurality of risk assessment parameters includes at least one of the following:
    performance materiality level of the entity;
    sample size risk consideration of the entity;
    sample size customized audit program for the entity or any combination thereof.

15. The system according to claim 1, wherein the plurality of risk assessment parameters comprises at least one of the following:
- an audit strategy of the entity;
- a business environment of the entity;
- an internal control of the entity;
- a meeting with management of the entity;
- a preliminary analytical review of the entity;
- an overall materiality of the entity;
- a risk consideration of the entity;
- an assertion level of risk assessment of the entity;
- a financial statements risk assessment of the entity or any combination thereof.

16. A method for generating an audit report assurance related planning process and documents for an entity, the method comprising:
- analyzing, by a first logical module, source data provided by a user to identify financial data with financial characteristics statements to generate a machine-coded financial document output for the entity including the identified financial data with financial characteristics statements;
- acquiring, by a second logical module, a response from the user for a sequentially provided plurality of questionnaire sets, wherein each questionnaire set comprises a plurality of queries associated with operation of the entity, and wherein the plurality of queries in a given questionnaire set is generated based on responses provided by the user to the plurality of queries included in a questionnaire set that precedes the given questionnaire set;
- training, by a fifth logical module, an artificial neural network using a first training dataset, wherein the first training dataset includes the acquired response from the user;
- analyzing, by the fifth logical module, the machine-coded output financial document using the trained artificial neural network and global financial trend external financial data, wherein the global financial trend external financial data is obtained or received from a third-party;
- generating a first user interface to display a first machine-coded questionnaires audit report for the entity, wherein the questionnaires audit report comprising a plurality of risk assessment auditing parameters;
- creating a second training dataset comprising at least one input from the user for at least one risk assessment auditing parameter of the plurality of risk assessment auditing parameters;
- training by the fifth logical module the artificial neural network using the second training dataset; and
- generating a second user interface to display a second machine-coded questionnaires audit report for the entity.

17. The method according to claim 16, wherein the system uses an automated machine learning module to identify the financial data with financial characteristics statements to generate a machine-coded financial output document for the entity.

18. The method according to claim 16, wherein the source data are analyzed using at least one analytical artificial intelligence algorithm.

19. The system according to claim 18, wherein the at least one analytical artificial intelligence algorithm comprises at least one supervised learning algorithm.

20. The method according to claim 16, wherein the plurality of questionnaire sets is related to at least one of the following:
- defining audit strategy of the entity;
- determining a business environment of the entity;
- determining internal controls of the entity;
- defining a risk consideration of the entity;
- determining an overall materiality (level) of the entity;
- meeting with management of the entity
- determining an audit program or auditing procedure of the entity;
- determining a performance materiality of the entity or any combination thereof.

21. The method according to claim 16, wherein the plurality of processing instructions comprises deep learning algorithms for providing the plurality of questionnaire sets.

22. The method according to claim 16, wherein the method further comprises training and validating the operation of the artificial neural network by an artificial neural network processing module, the artificial neural network processing module comprising:
- an artificial neural network training module for processing the acquired response from the user based on a pre-defined set of parameters, and determine a set of operating coefficients to be used by the artificial neural network when determining validity of the acquired response to the plurality of queries; and
- a response data history data store for maintaining all of the response provided by the user corresponding to the plurality of queries.

23. The method according to claim 22, wherein the artificial neural network training module is configured to train and validate the operation of the artificial neural network used on the operating coefficients generated and the response from the user in realtime.

24. The method according to claim 22, wherein the at least one processing unit is configured to use the trained artificial neural network to analyze the response acquired from the user for sequentially provided plurality of questionnaire sets for determining the overall materiality level of the entity.

25. The method according to claim 22, wherein the trained artificial neural network is configured to determine a threshold value and a materiality percentage level for analyzing the response acquired from the user for sequentially provided plurality of questionnaire sets and the identify financial data with financial nature/characteristics statements included in the machine-coded financial document output generated by the automated machine learning module.

26. The method according to claim 16, the method further comprises supervised learning or unsupervised learning to identify data with financial characteristics for generating a machine-coded output for the entity.

27. The method according to claim 16, the method using supervised learning comprises:
- determining the type of training set;
- gathering a training set;
- determining the input feature representation of the learned function; and
- determining structure of the learned function and corresponding learning algorithm.

* * * * *